US005940142A

United States Patent [19]

Wakitani et al.

[11] Patent Number: 5,940,142

[45] Date of Patent: Aug. 17, 1999

[54] DISPLAY DEVICE DRIVING FOR A GRAY SCALE EXPRESSION, AND A DRIVING CIRCUIT THEREFOR

[75] Inventors: Takao Wakitani; Kouichi Itsuda, both of Takatsuki, Japan

[73] Assignee: Matsushita Electronics Corporation, Osaka, Japan

[21] Appl. No.: 08/747,952

[22] Filed: Nov. 12, 1996

[30] Foreign Application Priority Data

Nov. 17, 1995 [JP] Japan .................................... 7-300326

[51] Int. Cl.[6] ...................................................... H04N 5/202

[52] U.S. Cl. .......................... 348/671; 348/687; 348/910; 345/77; 345/147

[58] Field of Search ..................................... 348/671, 687, 348/910, 607, 615; 345/147, 148, 77, 90, 99, 100, 214; H04N 5/14

[56] References Cited

U.S. PATENT DOCUMENTS 5,187,578 2/1993 Kohgami et al. ....................... 358/168

FOREIGN PATENT DOCUMENTS 0 444 962 A2 4/1991 European Pat. Off. .
WO 94/09473 4/1994 WIPO .............................. G09G 3/34

OTHER PUBLICATIONS

*Proceedings of the 1994 International Workshop on Active Matrix LCD's*, "New Category Contour Noise Observed in Pulse–Width Modulated Moving Images" (Oct. 13, 1994).

T. Masuda et al.; "New Category Contour Noise Observed in Pulse–Width–Modulated Moving Images"; *Technical Report of IEICE*. EID94–126 (1995–01); pp. 61–67 (English language abstract).

*Primary Examiner*—Victor R. Kostak
*Attorney, Agent, or Firm*—Panitch Schwarze Jacobs & Nadel, P.C.

[57] ABSTRACT

A display device driving for a gray scale expression, wherein at least a sub-field having the highest luminance value among plural sub-fields is further divided into a plurality of sub-field parts.

6 Claims, 46 Drawing Sheets

| Gray scale | Luminance | Sub5 | Sub6 | Sub8a | Sub7 | Sub8b | Sub1 | Sub2 | Sub3 | Sub4 |
|---|---|---|---|---|---|---|---|---|---|---|
| 1 | 0×B | OFF | OFF | OFF | OFF | OFF | OFF | OFF | OFF | OFF |
| 2 | 1×B | OFF | OFF | OFF | OFF | OFF | ON | OFF | OFF | OFF |
| 3 | 2×B | OFF | OFF | OFF | OFF | OFF | OFF | ON | OFF | OFF |
| ⋮ | ⋮ | ⋮ | ⋮ | ⋮ | ⋮ | ⋮ | ⋮ | ⋮ | ⋮ | ⋮ |
| 127 | 126×B | ON | ON | OFF | ON | OFF | OFF | ON | ON | ON |
| 128 | 127×B | ON | ON | OFF | ON | OFF | ON | ON | ON | ON |
| 129 | 128×B | OFF | OFF | ON | OFF | ON | OFF | OFF | OFF | OFF |
| ⋮ | ⋮ | ⋮ | ⋮ | ⋮ | ⋮ | ⋮ | ⋮ | ⋮ | ⋮ | ⋮ |
| 254 | 253×B | ON | ON | ON | ON | ON | ON | OFF | ON | ON |
| 255 | 254×B | ON | ON | ON | ON | ON | OFF | ON | ON | ON |
| 256 | 255×B | ON | ON | ON | ON | ON | ON | ON | ON | ON |

FIG. 2

| Sub-field | Sub5 | Sub6 | Sub8a | Sub7 | Sub8b | Sub1 | Sub2 | Sub3 | Sub4 |
|---|---|---|---|---|---|---|---|---|---|
| Luminance [×B] | $2^4$ | $2^5$ | $(1/2)\times 2^7$ | $2^6$ | $(1/2)\times 2^7$ | $2^0$ | $2^1$ | $2^2$ | $2^3$ |

FIG. 3

| Gray scale | Luminance | Sub5 | Sub6 | Sub8a | Sub7 | Sub8b | Sub1 | Sub2 | Sub3 | Sub4 |
|---|---|---|---|---|---|---|---|---|---|---|
| 1 | 0×B | OFF | OFF | OFF | OFF | OFF | OFF | OFF | OFF | OFF |
| 2 | 1×B | OFF | OFF | OFF | OFF | OFF | ON | OFF | OFF | OFF |
| 3 | 2×B | OFF | OFF | OFF | OFF | OFF | OFF | ON | OFF | OFF |
| ... | ... | ... | ... | ... | ... | ... | ... | ... | ... | ... |
| 127 | 126×B | ON | ON | OFF | ON | OFF | OFF | ON | ON | ON |
| 128 | 127×B | ON | ON | OFF | ON | OFF | ON | ON | ON | ON |
| 129 | 128×B | OFF | OFF | ON | OFF | ON | OFF | OFF | OFF | OFF |
| ... | ... | ... | ... | ... | ... | ... | ... | ... | ... | ... |
| 254 | 253×B | ON | ON | ON | ON | ON | ON | OFF | ON | ON |
| 255 | 254×B | ON | ON | ON | ON | ON | OFF | ON | ON | ON |
| 256 | 255×B | ON | ON | ON | ON | ON | ON | ON | ON | ON |

FIG. 7

| Sub-field | Sub-field signal | | | Number of the sustaining pulse |
|---|---|---|---|---|
| | Sf2 | Sf1 | Sf0 | |
| Sub5 | 1 | 0 | 0 | $2^4$ |
| Sub6 | 1 | 0 | 1 | $2^5$ |
| Sub8a | 1 | 1 | 1 | $(1/2)\times 2^7$ |
| Sub7 | 1 | 1 | 0 | $2^6$ |
| Sub8b | 1 | 1 | 1 | $(1/2)\times 2^7$ |
| Sub1 | 0 | 0 | 0 | $2^0$ |
| Sub2 | 0 | 0 | 1 | $2^1$ |
| Sub3 | 0 | 1 | 0 | $2^2$ |
| Sub4 | 0 | 1 | 1 | $2^3$ |

FIG. 9

| Sub-field | Sub5 | Sub6 | Sub8a | Sub7a | Sub8b | Sub7b | Sub1 | Sub2 | Sub3 | Sub4 |
|---|---|---|---|---|---|---|---|---|---|---|
| Luminance [×B] | $2^4$ | $2^5$ | $(1/2)\times 2^7$ | $(1/2)\times 2^6$ | $(1/2)\times 2^7$ | $(1/2)\times 2^6$ | $2^0$ | $2^1$ | $2^2$ | $2^3$ |

FIG. 10

| Gray scale | Luminance | Sub5 | Sub6 | Sub8a | Sub7a | Sub8b | Sub7b | Sub1 | Sub2 | Sub3 | Sub4 |
|---|---|---|---|---|---|---|---|---|---|---|---|
| 1 | 0×B | OFF | OFF | OFF | OFF | OFF | OFF | OFF | OFF | OFF | OFF |
| 2 | 1×B | OFF | OFF | OFF | OFF | OFF | OFF | ON | OFF | OFF | OFF |
| 3 | 2×B | OFF | OFF | OFF | OFF | OFF | OFF | OFF | ON | OFF | OFF |
| ... | ... | ... | ... | ... | ... | ... | ... | ... | ... | ... | ... |
| 127 | 126×B | ON | ON | OFF | ON | OFF | ON | OFF | ON | ON | ON |
| 128 | 127×B | ON | ON | OFF | ON | OFF | ON | ON | ON | ON | ON |
| 129 | 128×B | OFF | OFF | ON | OFF | ON | OFF | OFF | OFF | OFF | OFF |
| ... | ... | ... | ... | ... | ... | ... | ... | ... | ... | ... | ... |
| 254 | 253×B | ON | ON | ON | ON | ON | ON | ON | OFF | ON | ON |
| 255 | 254×B | ON | ON | ON | ON | ON | ON | OFF | ON | ON | ON |
| 256 | 255×B | ON | ON | ON | ON | ON | ON | ON | ON | ON | ON |

FIG. 13

| Sub-field | Sub-field signal | | | Number of the sustaining pulse |
|---|---|---|---|---|
| | Sf2 | Sf1 | Sf0 | |
| Sub5 | 1 | 0 | 0 | $2^4$ |
| Sub6 | 1 | 0 | 1 | $2^5$ |
| Sub8a | 1 | 1 | 1 | $(1/2) \times 2^7$ |
| Sub7a | 1 | 1 | 0 | $(1/2) \times 2^6$ |
| Sub8b | 1 | 1 | 1 | $(1/2) \times 2^7$ |
| Sub7b | 1 | 1 | 0 | $(1/2) \times 2^6$ |
| Sub1 | 0 | 0 | 0 | $2^0$ |
| Sub2 | 0 | 0 | 1 | $2^1$ |
| Sub3 | 0 | 1 | 0 | $2^2$ |
| Sub4 | 0 | 1 | 1 | $2^3$ |

F I G. 15

| Sub-field | Sub4 | Sub5 | Sub6a | Sub8a | Sub7a | Sub6b | Sub8b | Sub7b | Sub1 | Sub2 | Sub3 |
|---|---|---|---|---|---|---|---|---|---|---|---|
| Luminance [×B] | $2^3$ | $2^4$ | $(1/2)\times2^5$ | $(1/2)\times2^7$ | $(1/2)\times2^6$ | $(1/2)\times2^5$ | $(1/2)\times2^7$ | $(1/2)\times2^6$ | $2^0$ | $2^1$ | $2^2$ |

FIG. 16

| Gray scale | Luminance | Sub4 | Sub5 | Sub6a | Sub8a | Sub7a | Sub6b | Sub8b | Sub7b | Sub1 | Sub2 | Sub3 |
|---|---|---|---|---|---|---|---|---|---|---|---|---|
| 1 | 0×B | OFF | OFF | OFF | OFF | OFF | OFF | OFF | OFF | OFF | OFF | OFF |
| 2 | 1×B | OFF | OFF | OFF | OFF | OFF | OFF | OFF | OFF | ON | OFF | OFF |
| 3 | 2×B | OFF | OFF | OFF | OFF | OFF | OFF | OFF | OFF | OFF | ON | OFF |
| … | … | … | … | … | … | … | … | … | … | … | … | |
| 127 | 126×B | ON | ON | ON | OFF | ON | ON | OFF | ON | OFF | ON | ON |
| 128 | 127×B | ON | ON | ON | OFF | ON | ON | OFF | ON | ON | ON | ON |
| 129 | 128×B | OFF | OFF | OFF | ON | OFF | OFF | ON | OFF | OFF | OFF | OFF |
| … | … | … | … | … | … | … | … | … | … | … | … | |
| 254 | 253×B | ON | ON | ON | ON | ON | ON | ON | ON | ON | OFF | ON |
| 255 | 254×B | ON | ON | ON | ON | ON | ON | ON | ON | OFF | ON | ON |
| 256 | 255×B | ON | ON | ON | ON | ON | ON | ON | ON | ON | ON | ON |

FIG. 19

| Sub-field | Sub-field signal | | | Number of the sustaining pulse |
|---|---|---|---|---|
| | Sf2 | Sf1 | Sf10 | |
| Sub4 | 0 | 1 | 1 | $2^3$ |
| Sub5 | 1 | 0 | 0 | $2^4$ |
| Sub6a | 1 | 0 | 1 | $(1/2)\times 2^5$ |
| Sub8a | 1 | 1 | 1 | $(1/2)\times 2^7$ |
| Sub7a | 1 | 1 | 0 | $(1/2)\times 2^6$ |
| Sub6b | 1 | 0 | 1 | $(1/2)\times 2^5$ |
| Sub8b | 1 | 1 | 1 | $(1/2)\times 2^7$ |
| Sub7b | 1 | 1 | 0 | $(1/2)\times 2^6$ |
| Sub1 | 0 | 0 | 0 | $2^0$ |
| Sub2 | 0 | 0 | 1 | $2^1$ |
| Sub3 | 0 | 1 | 0 | $2^2$ |

F I G. 21

| Sub-field | Sub4 | Sub5a | Sub7a | Sub8a | Sub6a | Sub5b | Sub7b | Sub8b | Sub6b | Sub1 | Sub2 | Sub3 |
|---|---|---|---|---|---|---|---|---|---|---|---|---|
| Luminance [×B] | $2^3$ | $(1/2)\times2^4$ | $(1/2)\times2^6$ | $(1/2)\times2^7$ | $(1/2)\times2^5$ | $(1/2)\times2^4$ | $(1/2)\times2^6$ | $(1/2)\times2^7$ | $(1/2)\times2^5$ | $2^0$ | $2^1$ | $2^2$ |

FIG. 22

| Gray scale | Luminance | Sub4 | Sub5a | Sub7a | Sub8a | Sub6a | Sub5b | Sub7b | Sub8b | Sub6b | Sub1 | Sub2 | Sub3 |
|---|---|---|---|---|---|---|---|---|---|---|---|---|---|
| 1 | 0×B | OFF | OFF | OFF | OFF | OFF | OFF | OFF | OFF | OFF | OFF | OFF | OFF |
| 2 | 1×B | OFF | OFF | OFF | OFF | OFF | OFF | OFF | OFF | OFF | ON | OFF | OFF |
| 3 | 2×B | OFF | OFF | OFF | OFF | OFF | OFF | OFF | OFF | OFF | OFF | ON | OFF |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 127 | 126×B | ON | ON | ON | OFF | ON | ON | ON | OFF | ON | OFF | ON | ON |
| 128 | 127×B | ON | ON | ON | OFF | ON | ON | ON | OFF | ON | ON | ON | ON |
| 129 | 128×B | OFF | OFF | OFF | ON | OFF | OFF | OFF | ON | OFF | OFF | OFF | OFF |
| ⋮ | ⋮ | ⋮ | ⋮ | ⋮ | ⋮ | ⋮ | ⋮ | ⋮ | ⋮ | ⋮ | ⋮ | ⋮ | ⋮ |
| 254 | 253×B | ON | ON | ON | ON | ON | ON | ON | ON | ON | ON | OFF | ON |
| 255 | 254×B | ON | ON | ON | ON | ON | ON | ON | ON | ON | OFF | ON | ON |
| 256 | 255×B | ON | ON | ON | ON | ON | ON | ON | ON | ON | ON | ON | ON |

FIG. 25

| Sub-field | Sub-field signal | | | Number of the sustaining pulse |
|---|---|---|---|---|
| | Sf2 | Sf1 | Sf0 | |
| Sub4 | 0 | 1 | 1 | $2^3$ |
| Sub5a | 1 | 0 | 0 | $(1/2)\times 2^4$ |
| Sub7a | 1 | 1 | 0 | $(1/2)\times 2^6$ |
| Sub8a | 1 | 1 | 1 | $(1/2)\times 2^7$ |
| Sub6a | 1 | 0 | 1 | $(1/2)\times 2^5$ |
| Sub5b | 1 | 0 | 0 | $(1/2)\times 2^4$ |
| Sub7b | 1 | 1 | 0 | $(1/2)\times 2^6$ |
| Sub8b | 1 | 1 | 1 | $(1/2)\times 2^7$ |
| Sub6b | 1 | 0 | 1 | $(1/2)\times 2^5$ |
| Sub1 | 0 | 0 | 0 | $2^0$ |
| Sub2 | 0 | 0 | 1 | $2^1$ |
| Sub3 | 0 | 1 | 0 | $2^2$ |

F I G. 27

| Sub-field | Sub5a | Sub6a | Sub7a | Sub8a | Sub1 | Sub2 | Sub3 | Sub4 | Sub5b | Sub6b | Sub7b | Sub8b |
|---|---|---|---|---|---|---|---|---|---|---|---|---|
| Luminance [×B] | $(1/2)\times 2^4$ | $(1/2)\times 2^5$ | $(1/2)\times 2^6$ | $(1/2)\times 2^7$ | $2^0$ | $2^1$ | $2^2$ | $2^3$ | $(1/2)\times 2^4$ | $(1/2)\times 2^5$ | $(1/2)\times 2^6$ | $(1/2)\times 2^7$ |

FIG. 28

| Gray scale | Luminance | Sub5a | Sub6a | Sub7a | Sub8a | Sub1 | Sub2 | Sub3 | Sub4 | Sub5b | Sub6b | Sub7b | Sub8b |
|---|---|---|---|---|---|---|---|---|---|---|---|---|---|
| 1 | 0×B | OFF | OFF | OFF | OFF | OFF | OFF | OFF | OFF | OFF | OFF | OFF | OFF |
| 2 | 1×B | OFF | OFF | OFF | OFF | ON | OFF | OFF | OFF | OFF | OFF | OFF | OFF |
| 3 | 2×B | OFF | OFF | OFF | OFF | OFF | ON | OFF | OFF | OFF | OFF | OFF | OFF |
| ... | ... | ... | ... | ... | ... | ... | ... | ... | ... | ... | ... | ... | ... |
| 127 | 126×B | ON | ON | ON | OFF | OFF | ON | ON | ON | ON | ON | ON | OFF |
| 128 | 127×B | ON | ON | ON | OFF | ON | ON | ON | ON | ON | ON | ON | OFF |
| 129 | 128×B | OFF | OFF | OFF | ON | OFF | OFF | OFF | OFF | OFF | OFF | OFF | ON |
| ... | ... | ... | ... | ... | ... | ... | ... | ... | ... | ... | ... | ... | ... |
| 254 | 253×B | ON | ON | ON | ON | ON | OFF | ON | ON | ON | ON | ON | ON |
| 255 | 254×B | ON | ON | ON | ON | OFF | ON | ON | ON | ON | ON | ON | ON |
| 256 | 255×B | ON | ON | ON | ON | ON | ON | ON | ON | ON | ON | ON | ON |

FIG. 31

| Sub-field | Sub-field signal | | | Number of the sustaining pulse |
|---|---|---|---|---|
| | Sf2 | Sf1 | Sf0 | |
| Sub5a | 1 | 0 | 0 | $(1/2)\times 2^4$ |
| Sub6a | 1 | 0 | 1 | $(1/2)\times 2^5$ |
| Sub7a | 1 | 1 | 0 | $(1/2)\times 2^6$ |
| Sub8a | 1 | 1 | 1 | $(1/2)\times 2^7$ |
| Sub1 | 0 | 0 | 0 | $2^0$ |
| Sub2 | 0 | 0 | 1 | $2^1$ |
| Sub3 | 0 | 1 | 0 | $2^2$ |
| Sub4 | 0 | 1 | 1 | $2^3$ |
| Sub5b | 1 | 0 | 0 | $(1/2)\times 2^4$ |
| Sub6b | 1 | 0 | 1 | $(1/2)\times 2^5$ |
| Sub7b | 1 | 1 | 0 | $(1/2)\times 2^6$ |
| Sub8b | 1 | 1 | 1 | $(1/2)\times 2^7$ |

FIG. 35 (Prior Art)

| Sub-field | Sub1 | Sub2 | Sub3 | Sub4 | Sub5 | Sub6 | Sub7 | Sub8 |
|---|---|---|---|---|---|---|---|---|
| Luminance [×B] | $2^0$ | $2^1$ | $2^2$ | $2^3$ | $2^4$ | $2^5$ | $2^6$ | $2^7$ |

FIG. 36 (Prior Art)

| Gray scale | Luminance | Sub1 | Sub2 | Sub3 | Sub4 | Sub5 | Sub6 | Sub7 | Sub8 |
|---|---|---|---|---|---|---|---|---|---|
| 1 | 0×B | OFF | OFF | OFF | OFF | OFF | OFF | OFF | OFF |
| 2 | 1×B | ON | OFF | OFF | OFF | OFF | OFF | OFF | OFF |
| 3 | 2×B | OFF | ON | OFF | OFF | OFF | OFF | OFF | OFF |
| ... | ... | ... | ... | ... | ... | ... | ... | ... | ... |
| 127 | 126×B | OFF | ON | ON | ON | ON | ON | ON | OFF |
| 128 | 127×B | ON | ON | ON | ON | ON | ON | ON | OFF |
| 129 | 128×B | OFF | OFF | OFF | OFF | OFF | OFF | OFF | ON |
| ... | ... | ... | ... | ... | ... | ... | ... | ... | ... |
| 254 | 253×B | ON | OFF | ON | ON | ON | ON | ON | ON |
| 255 | 254×B | OFF | ON | ON | ON | ON | ON | ON | ON |
| 256 | 255×B | ON | ON | ON | ON | ON | ON | ON | ON |

FIG. 40 (Prior Art)

| Sub-field | Sub7b | Sub8b | Sub1 | Sub2 | Sub3 | Sub4 | Sub5 | Sub6 | Sub7a | Sub8a |
|---|---|---|---|---|---|---|---|---|---|---|
| Luminance [×B] | $(1/2)\times 2^6$ | $(1/2)\times 2^7$ | $2^0$ | $2^1$ | $2^2$ | $2^3$ | $2^4$ | $2^5$ | $(1/2)\times 2^6$ | $(1/2)\times 2^7$ |

FIG. 41 (Prior Art)

| Gray scale | Luminance | Sub7b | Sub8b | Sub1 | Sub2 | Sub3 | Sub4 | Sub5 | Sub6 | Sub7a | Sub8a |
|---|---|---|---|---|---|---|---|---|---|---|---|
| 1 | 0×B | OFF | OFF | OFF | OFF | OFF | OFF | OFF | OFF | OFF | OFF |
| 2 | 1×B | OFF | OFF | ON | OFF | OFF | OFF | OFF | OFF | OFF | OFF |
| 3 | 2×B | OFF | OFF | OFF | ON | OFF | OFF | OFF | OFF | OFF | OFF |
| ⋮ | ⋮ | ⋮ | ⋮ | ⋮ | ⋮ | ⋮ | ⋮ | ⋮ | ⋮ | ⋮ | ⋮ |
| 127 | 126×B | ON | OFF | OFF | ON | ON | ON | ON | ON | ON | OFF |
| 128 | 127×B | ON | OFF | ON | ON | ON | ON | ON | ON | ON | OFF |
| 129 | 128×B | OFF | ON | OFF | OFF | OFF | OFF | OFF | OFF | OFF | ON |
| ⋮ | ⋮ | ⋮ | ⋮ | ⋮ | ⋮ | ⋮ | ⋮ | ⋮ | ⋮ | ⋮ | ⋮ |
| 254 | 253×B | ON | ON | ON | OFF | ON | ON | ON | ON | ON | ON |
| 255 | 254×B | ON | ON | OFF | ON | ON | ON | ON | ON | ON | ON |
| 256 | 255×B | ON | ON | ON | ON | ON | ON | ON | ON | ON | ON |

DISPLAY DEVICE DRIVING FOR A GRAY SCALE EXPRESSION, AND A DRIVING CIRCUIT THEREFOR

FIELD OF THE INVENTION AND RELATED ART STATEMENT

1. Field of the Invention

The present invention relates to a display device driving for a gray scale expression, which is used for image display on TV, advertisement display board, etc., and a driving circuit therefor.

2. Description of the Related Art

A conventional general driving method of sequentially displaying plural sub-fields in a field period has been widely used up to now as a driving method for a gray scale expression in a display device such as PDP (plasma display panel), LCD (liquid crystal display) and EL (electroluminescence) display device. For example, N pieces of sub-fields having emission luminance values proportional to $2^0$, $2^1$, . . . , and $2^{N-1}$, respectively, are displayed selectively and sequentially in the field period of 1/60 second. Thereby, it is possible to perform a gray scale expression having $2^N$ gray scales every 1/60 second. This driving method will be explained more specifically taking an AC-type PDP as an example.

FIG. 32 is a wiring diagram showing an electrode arrangement for an AC-type PDP. As shown in FIG. 32, the electrode arrangement for the AC-type PDP is formed in a matrix. In a direction of column, there are provided M columns of data electrodes $DA_1$, to $DA_M$. In a direction of line, there are provided N line s of scanning electrodes $SCN_1$, to $SCN_N$ and N lines of sustaining electrodes $SUS_1$ to $SUS_N$. In other words, the AC-type PDP has discharge cells of M×N dots arranged in a matrix having M columns and N lines.

Another conventional general driving method for displaying in this AC-type PDP will be elucidated with reference to FIG. 33.

FIG. 33 is a time chart showing timings of voltage pulses applied to the respective electrodes in the AC-type PDP.

As shown in FIG. 33, in a writing period, a positive writing pulse voltage +Vw [V] is applied to certain ones of the data electrodes $DA_1$ to $DA_M$ which correspond to the discharge cells to be lit for display. At the same time, a negative scanning pulse voltage −Vs [V] is applied to the first scanning electrode $SCN_1$. Thereby, a writing discharge occurs at respective intersections between the above-mentioned certain ones of the data electrodes $DA_1$ to $DA_M$ and the first scanning electrode $SCN_1$.

Successively, the positive writing pulse voltage +Vw[V] is applied to certain ones of the data electrodes $DA_1$ to $DA_M$ which correspond to the discharge cells to be lit for the display. At the same time, the negative scanning pulse voltage −Vs [V] is applied to the second scanning electrode $SCN_2$. Thereby, the writing discharge occurs at the respective intersections between the abovementioned certain ones of the data electrodes $DA_1$ to $DA_M$ and the second scanning electrode $SCN_2$. Operations similar to that described above are conducted in succession. In the end, the positive writing pulse voltage +Vw [V] is applied to certain ones of data electrodes $DA_1$ to $DA_M$ which correspond to the discharge cells to be lit for the display. At the same time, the negative scanning pulse voltage −Vs [V] is applied to the N-th scanning electrode $SCN_N$. Thereby, the writing discharge occurs at the respective intersections between the above-mentioned certain ones of the data electrodes $DA_1$ to $DA_M$ and the N-th scanning electrode $SCN_N$.

Subsequently, in a sustaining period, all the sustaining electrodes $SUS_1$ to $SUS_N$ and all the scanning electrodes $SCN_1$ to $SCN_N$ are alternately supplied with the negative sustaining pulse voltage −Vs [V]. Thereby, a sustaining discharge occurs at the discharge cells corresponding to the discharge cells lit in the writing period. The sustaining discharge continues during the application of the sustaining pulse voltage. Emission due to the sustaining discharge is used to display images or the like.

Subsequently, in an erasing period, all the sustaining electrodes $SUS_1$ to $SUS_N$ are supplied with a negative narrow erasing pulse voltage −Vs [V], so that the sustaining discharge is stopped by generation of an erasing discharge.

By the above-mentioned operation, the image display is performed on a screen of the AC-type PDP. The luminance of a display screen is proportional to the total time of the sustaining discharge, namely, the number of applying times of the sustaining pulse voltage. Accordingly, a displaying operation only offers display having a certain luminance value. Therefore, the displaying operation consisting of a sequence of the writing period, the sustaining period, and the erasing period shown in FIG. 33 is used as the displaying operation of a sub-field. Furthermore, the respective displaying operations in plural sub-fields having different luminance values are repeated sequentially, thereby the gray scale expression is performed.

A first conventional display device driving for the gray scale expression will be explained with reference to FIG. 34 and FIG. 35.

FIG. 34 is an explanatory view showing an arrangement of plural sub-fields in a first conventional display device driving for the gray scale expression. FIG. 35 is a table showing a relation between luminance and the plural sub-fields of FIG. 34.

As shown in FIG. 34, the field period (1/60 second) in TV display method is divided into eight sub-fields Sub1, Sub2, . . . , and Sub8 with respect to time. In addition, each of emission display in the eight sub-fields Sub1, Sub2, . . . , and Sub8 is selectively performed in numerical order. Thereby, the gray scale expression having the $2^8$ (=256) gray scales every 1/60 second. Each of the eight sub-fields Sub1, Sub2, . . . , and Sub8 consists of the sequence of the writing period, the sustaining period, and the erasing period shown in FIG. 33.

As shown in FIG. 34, each of the sustaining period is set in the eight sub-fields Sub1, Sub2, . . . , and Sub8 so that the display screens of the eight sub-fields Sub1, Sub2, . . . , and Sub8 obtain luminance values proportional to $2^0$, $2^1$, . . . , and $2^7$, respectively. Therefore, as shown in FIG. 35, the display screens of the eight sub-fields Sub1, Sub2, . . . , and Sub8 have luminance values of $2^0$×B, $2^1$×B, . . . , and $2^7$×B (cd/m$^2$), respectively. B (cd/m$^2$) represents a unit luminance.

A concrete method of attaining the 256 gray scales in the first conventional display device driving is shown in FIG. 36.

FIG. 36 is a table showing a concrete method of attaining 256 gray scales in the first conventional display device driving for the gray scale expression.

In FIG. 36, ON designates a sub-field which performs the displaying operation, and OFF designates a sub-field which does not perform the displaying operation.

As shown in FIG. 36, the display screen having the 256 gray scales can be obtained by combining the ON and OFF states of the eight sub-fields Sub1, Sub2, . . . , and Sub8 in various patterns, wherein the 256 gray scales are in the range from a first gray scale (luminance 0) caused by the OFF states of all sub-fields to 256-th gray scale (luminance 255×B) caused by the ON states of all sub-fields.

However, in this first conventional display device driving, when specific two gray scales (e.g., 128-th and 129-th gray scales) are continuously used for the display, there is a problem that flicker noise occurs on the display screen.

The flicker noise in the first conventional display device driving will be elucidated with reference to FIG. 37 and FIG. 38.

FIG. 37 is a diagram showing a timing of the display when 128-th gray scale (127×B cd/$m^2$) and 127-th gray scale (126×B cd/$m^2$) are alternately and repeatedly displayed every one field in the first conventional display device driving. FIG. 38 is a diagram showing a timing of the display when 129-th gray scale (128×B cd/$m^2$) and the 128-th gray scale (127×B cd/$m^2$) are alternately and repeatedly displayed every one field in the first conventional display device driving.

In FIG. 37, the 128-th gray scale (127×B cd/$m^2$) and 127-th gray scale (126×B cd/$m^2$) are alternately and repeatedly displayed every one field (1/60 second). On the other hand, in FIG. 38, the 129-th gray scale (128×B cd/$m^2$) and the 128-th gray scale (127×B cd/$m^2$) are alternately and repeatedly displayed every one field (1/60 second).

However, as shown in FIG. 38, in two continuous fields, the display of the sub-field having the 129-th gray scale (128×B cd/$m^2$) and the display of the subsequent sub-field having the 128-th gray scale (127×B cd/$m^2$) are continuous with respect to time. Therefore, these luminance values of above-mentioned two displays are added, and it is appeared that the 256-th gray scale (255×B cd/$m^2$) is repeatedly displayed every two fields (1/30 second). As a result, undesirable flicker noise is observed on the display screen, thereby causing a serious problem in the gray scale expression.

Furthermore, in the display of moving images, in the case that the 129-th gray scale (128×B cd/$m^2$) and the 128-th gray scale (127×B cd/$m^2$) are displayed by the discharge cells or small groups of the discharge cells adjacent to each other, the 129-th gray scale (128×B cd/$m^2$) and the 128-th gray scale (127×B cd/$m^2$) should be alternately and repeatedly displayed at every the discharge cells or at every the small groups in accordance with the moving images.

However, as has been explained in the above, the 256-th gray scale (255×B cd/$m^2$) is repeatedly displayed every the two fields (1/30 second). As a result, the undesirable flicker noise is observed on a part of the display screen, thereby causing significant decay of image quality.

A second conventional display device driving for the gray scale expression will be explained with reference to FIG. 39 and FIG. 40.

FIG. 39 is an explanatory view showing an arrangement of plural sub-fields in a second conventional display device driving for the gray scale expression. FIG. 40 is a table showing a relation between luminance and the plural sub-fields of FIG. 39.

As shown in FIG. 39, the field period (1/60 second) in TV display method is divided into ten sub-fields Sub7*b*, Sub8*b*, Sub1, Sub2, . . . , Sub7*a*, and Sub8*a* with respect to time. In addition, each of emission display in the ten sub-fields Sub7*b*, Sub8*b*, Sub1, Sub2, . . . , Sub7*a*, and Sub8*a* is selectively performed in that order. Thereby, the gray scale expression having the $2^8$ (=256) gray scales every 1/60 second. Each of the ten sub-fields Sub7*b*, Sub8*b*, Sub1, Sub2, . . . , Sub7*a*, and Sub8*a* consists of the sequence of the writing period, the sustaining period, and the erasing period shown in FIG. 33.

The second conventional display device driving for the gray scale expression differs from the first conventional display device driving for the gray scale expression in the following two points (1) and (2).

(1) The sub-fields Sub7 and SubB in the first conventional driving method are each divided into two sub-fields, that is, Sub7*a* and Sub7*b*, and Sub8*a* and Sub8*b*, respectively, in the second conventional display device driving.

(2) Sub-fields Sub7*b* and Sub8*b* are disposed at the front of the field.

In this second conventional display device driving, each of the sustaining period is set in the six sub-fields Sub 1, Sub 2, . . . , and Sub 6 so that the display screens of the six sub-fields Sub 1, Sub 2, . . . and Sub 6 obtain luminance values proportional to $2^0$, $2^1$, . . . , and $2^5$, respectively. In addition, each of the sustaining period is set in the rest of the four sub-fields Sub7*a*, Sub7*b*, Sub8*a* and Sub8*b* so that the display screens of the four sub-fields Sub7*a*, Sub7*b*, Sub8*a* and Sub8*b* obtain luminance values proportional to ½x$2^6$, ½x$2^6$, ½x$2^7$ and ½x$2^7$, respectively.

Accordingly, as shown in FIG. 40, the display screens of the ten sub-fields Sub7*b*, Sub8*b*, . . . , Sub7*a*, and Sub8*a* have the luminance values of (½)x$2^6$×B, (½)x$2^7$×B, . . . , (½)x$2^6$×B, and (½)x$2^7$×B (cd/$m^2$), respectively.

A concrete method of attaining the 256 gray scales in the second conventional display device driving is shown in FIG. 41.

FIG. 41 is a table showing a concrete method of attaining 256 gray scales in the second conventional display device driving for the gray scale expression.

In FIG. 41, ON designates a sub-field which performs the displaying operation, and OFF designates a sub-field which does not perform the displaying operation.

As shown in FIG. 41, the display screen having the 256 gray scales can be obtained by combining the ON and OFF states of the ten sub-fields Sub 7*b*, Sub 8*b*, Sub1, Sub2, . . . , Sub7*a*, and Sub8*a* in various patterns, wherein the 256 gray scales are in the range from a first gray scale (luminance 0) caused by the OFF states of all sub-fields to a 256-th gray scale (luminance 255×B) caused by the ON states of all sub-fields.

However, even in the second conventional display device driving, when specific two gray scales (e.g., the 128-th and the 129-th gray scales) are continuously used for the display, there is a problem that flicker noise occurs on the display screen.

The flicker noise in the second conventional display device driving will be elucidated with reference to FIG. 42 and FIG. 43.

FIG. 42 is a diagram showing a timing of the display when the 128-th gray scale (127×B cd/$m^2$) and the 127-th gray scale (126×B cd/$m^2$) are alternately and repeatedly displayed every one field in the second conventional display device driving. FIG. 43 is a diagram showing a timing of the display when the 129-th gray scale (128×B cd/$m^2$) and the 128-th gray scale (127×B cd/$m^2$) are alternately and repeatedly displayed every one field in the second conventional display device driving.

In FIG. 42, the 128-th gray scale (127×B cd/$m^2$) divided into (½)×64×B (cd/$m^2$) and 95×B (cd/$m^2$), and the 127-th gray scale (126×B cd/$m^2$) divided into (½)×64×B (cd/$m^2$) and 94×B (cd/$m^2$) are alternately and repeatedly displayed every one field (1/60 second). On the other hand, in FIG. 43, the 129-th gray scale (128×B cd/$m^2$) and the 128-th gray scale (127×B cd/$m^2$) should be alternately and repeatedly displayed every one field (1/60 second).

However, in the case of the display shown by FIG. 43, it is impossible to perform the gray scale expression properly. This is the reason why the luminance of the display of the first half (½×128×B cd/$m^2$) of the sub-field having the 129-th gray scale is lower than the luminance of the subsequent display. Therefore, the display of the first half is independently repeated in every two fields (1/30 second). Furthermore, the display of the second half (½×128×B cd/$m^2$) of the sub-field having the 129-th gray scale is continuously linked with the display of the first half (½×64×B cd/$m^2$) of the subsequent sub-field having the 128-th gray scale with respect to time. Therefore, these luminance values of the above-mentioned two displays are added, thereby causing a high luminance value of 96×B (cd/$m^2$). Moreover, the display of the second half (95×B cd/$m^2$) of the sub-field having the 128-th gray scale value is performed slightly later. Therefore value of table part of the luminance value of the display of the second half (95×B cd/$m^2$) is added further to 96×B (cd/$m^2$). As a result, a display having a high luminance value of close to 96+95 (=191)×B cd/$m^2$ is repeated every two fields (1/30 second).

Thus, the display in the second conventional display device driving is slightly better than that of the first conventional display device driving. However, even in the second conventional display device driving, there is the problem that the flicker noise occurs on the display screen. Furthermore, in the display of the moving images, the undesirable flicker noise is observed on a part of the display screen, thereby causing significant decay of image quality.

A third conventional display device driving for the gray scale expression will be explained with reference to FIG. 44.

FIG. 44 is an explanatory view showing an arrangement of plural sub-fields in a third conventional display device driving for the gray scale expression.

As shown in FIG. 44, the field period (1/60 second) in TV display method is divided into sixteen sub-fields Sub1_a_, Sub2_a_, . . . , Sub7_a_, Sub8_a_, Sub1_b_, Sub2_b_, . . . , Sub7_b_, and Sub8_b_ with respect to time. In addition, each of emission display in the sixteen sub-fields Sub1_a_, Sub2_a_, . . . , Sub7_a_, Sub8_a_, Sub1_b_, Sub1_b_, . . . , Sub7_b_, and Sub8_b_ is selectively performed in that order. Thereby, the gray scale expression having the $2^8$ (=256) gray scales every 1/60 second.

In the third conventional display device driving, luminance values of the sub-fields Sub1, Sub2_a_, . . . , and Sub8_a_ are equal to halves of those of the sub-fields Sub1, Sub2, . . . , Sub8 of the first conventional display device driving, respectively. Similarly, luminance values of the sub-fields Sub1_b_, Sub2_b_, . . . , Sub8_b_ are equal to halves of those of the sub-fields Sub1, Sub2, . . . , Sub8 of the first conventional display device driving, respectively.

However, even in the third conventional display device driving, when specific two gray scales (e.g., the 128-th and the 129-th gray scales) are continuously used for the display, there is a problem that flicker noise occurs on the display screen.

The flicker noise in the third conventional display device driving will be elucidated with reference to FIG. 45 and FIG. 46.

FIG. 45 is a diagram showing a timing of the display when the 128-th gray scale (127×B cd/$m^2$) and the 127-th gray scale (126×B cd/$m^2$) are alternately and repeatedly displayed every one field in the third conventional display device driving. FIG. 46 is a diagram showing a timing of the display when the 129-th gray scale (128×B cd/$m^2$) and the 128-th gray scale (127×B cd/$m^2$) are alternately and repeatedly displayed every one field in the third conventional display device driving.

In FIG. 45, the 128-th gray scale (127×B cd/$m^2$) divided into a first half( ½×127×B cd/$m^2$) and a second half (½×127×B cd/$m^2$), and the 127-th gray scale (126×B cd/$m^2$) divided into a first half (½×126×B cd/$m^2$) and a second half (½×126×B cd/$m^2$) are alternately and repeatedly performed every one field (1/60 second). On the other hand, in FIG. 46, the 129-th gray scale (128×B cd/$m^2$) and the 128-th gray scale (127×B cd/$m^2$) should be alternately and repeatedly displayed every one field (1/60 second).

However, in the case of the display shown in FIG. 46, it is impossible to perform the gray scale expression properly. This is the reason why luminance of the display of the first half (½×128×B cd/$m^2$) of the sub-field having the 129-th gray scale and luminance of the display of the second half (½×127×B cd/$m^2$) of the sub-field having the 128-th gray scale are lower than that of the subsequent display. Therefore, these displays are independently repeated every two fields (1/30 second). Furthermore, the display of the second half (½×128×B cd/$m^2$) of the sub-field having the 129-th gray scale is continuously linked with the display of the first half (½×127×B cd/$m^2$) of the subsequent sub-field having the 128-th gray scale with respect to time. Therefore, these luminance values of the above-mentioned two displays are added, thereby causing a high luminance of ½×255×B (cd/$m^2$). As a result, a display having a high luminance value of ½×255×B (cd/$m^2$) is repeated every the two fields (1/30 second).

Thus, the display in the third conventional display device driving is slightly better than that of the first conventional display device driving. However, even in the third conventional display device driving, there is the problem that the flicker noise occurs on the display screen. Furthermore, in the display of the moving images, the undesirable flicker noise is observed on a part of the display screen, thereby causing significant decay of image quality.

As has been explained in the above, in all the conventional display device drivings for the gray scale expression, when specific two gray scales are continuously used for the display, there is the problem that the flicker noise occurs on the display screen. Thereby, it is impossible to increase the image quality.

OBJECT AND SUMMARY OF THE INVENTION

The object of the present invention is to provide a display device driving for a gray scale expression that can solve the aforementioned problems.

In order to achieve the above-mentioned object, a display device driving for a gray scale expression in accordance with the present invention comprises:

step of dividing each one or more sub-fields having the highest luminance value and subsequent luminance values in descending order among plural sub-fields into a plurality of sub-field parts from a sub-field, and step of disposing the plurality of sub-field parts in the field period separately.

In the display device driving for the gray scale expression in accordance with the present invention, one or more the plural sub-fields having the highest luminance value and subsequent luminance values among the plural sub-fields are divided into a plurality of the sub-field parts in descending order. Furthermore, the plurality of the sub-field parts are dispersedly disposed in the field period. Thereby, emission display having the highest luminance value is divided and displayed at a plurality of times in the field period. As a result, time interval of the emission display offers a condition equivalent to that obtained when the field period is substantially shortened, thereby obtaining image display having accurate gray scale with no flicker noise.

BRIEF DESCRIPTION OF THE DRAWINGS

FIG. 2 is a table showing a relation between luminance and the nine sub-fields of FIG. 1.

FIG. 3 is a table showing a concrete method of attaining 256 gray scales in the first embodiment of the present invention.

FIG. 7 is a table showing a relation among the sub-field, the sub-field signal, and number of the sustaining pulse in the first embodiment of the present invention.

FIG. 9 is a table showing a relation between luminance and the ten sub-fields of FIG. 8.

FIG. 10 is a table showing a concrete method of attaining 256 gray scales in the second embodiment of the present invention.

FIG. 13 is a table showing a relation among the sub-field, the sub-field signal, and number of the sustaining pulse in the second embodiment of the present invention.

FIG. 15 is a table showing a relation between luminance and the eleven sub-fields of FIG. 14.

FIG. 16 is a table showing a concrete method of attaining 256 gray scales in the third embodiment of the present invention.

FIG. 19 is a table showing a relation among the sub-field, the sub-field signal, and number of the sustaining pulse in the third embodiment of the present invention.

FIG. 21 is a table showing a relation between luminance and the twelve sub-fields of FIG. 20.

FIG. 22 is a table showing a concrete method of attaining 256 gray scales in the fourth embodiment of the present invention.

FIG. 25 is a table showing a relation among the sub-field, the sub-field signal, and number of the sustaining pulse in the fourth embodiment of the present invention.

FIG. 27 is a table showing a relation between luminance and the twelve sub-fields of FIG. 26.

FIG. 28 is a table showing a concrete method of attaining 256 gray scales in the fifth embodiment of the present invention.

FIG. 31 is a table showing a relation among the sub-field, the sub-field signal, and number of the sustaining pulse in the fifth embodiment of the present invention.

FIG. 35 is a table showing a relation between luminance and the plural sub-fields of FIG. 34.

FIG. 36 is a table showing a concrete method of attaining 256 gray scales in the first conventional display device driving for the gray scale expression.

FIG. 40 is a table showing a relation between luminance and the plural sub-fields of FIG. 39.

FIG. 41 is a table showing a concrete method of attaining 256 gray scales in the second conventional display device driving for the gray scale expression.

DESCRIPTION OF THE PREFERRED EMBODIMENT

Hereafter, preferred embodiments of the present invention are described with reference to the accompanying drawings.

<Embodiment 1>

Figure 1:
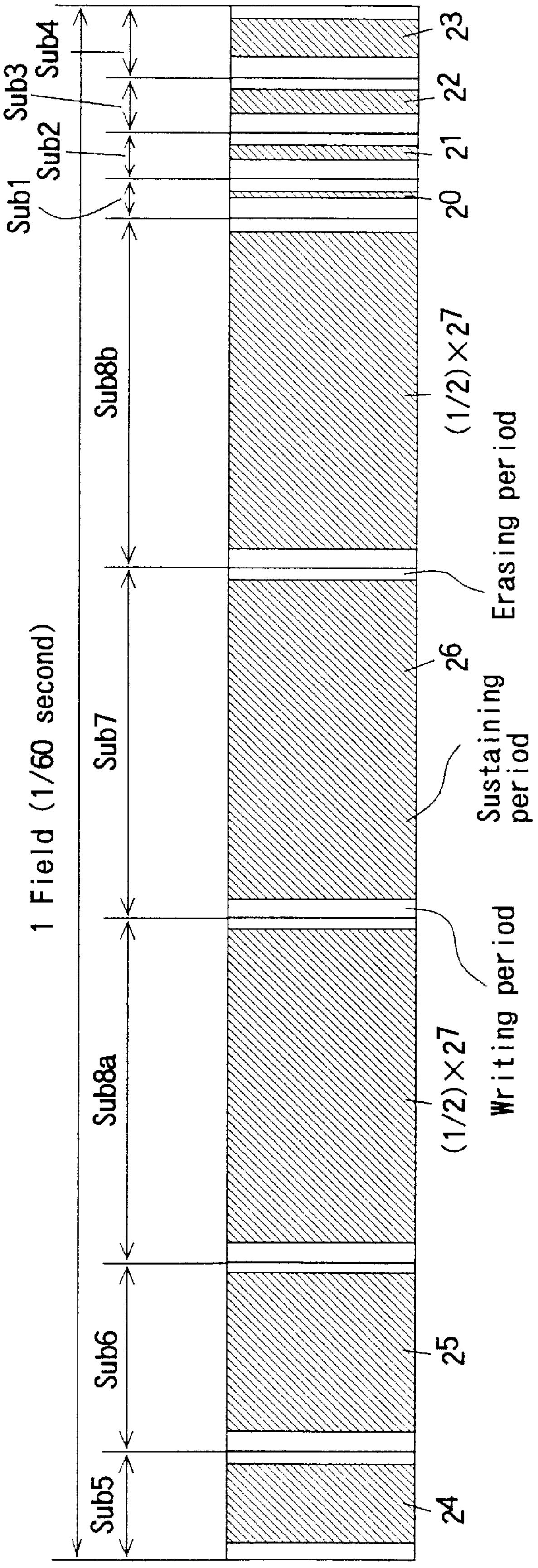
FIG. 1 is an explanatory view showing an arrangement of plural sub-fields in a display device driving for a gray scale expression in a first embodiment of the present invention.

FIG. 1 is an explanatory view showing an arrangement of plural sub-fields in a display device driving for a gray scale expression in a first embodiment of the present invention.

Figure 33:
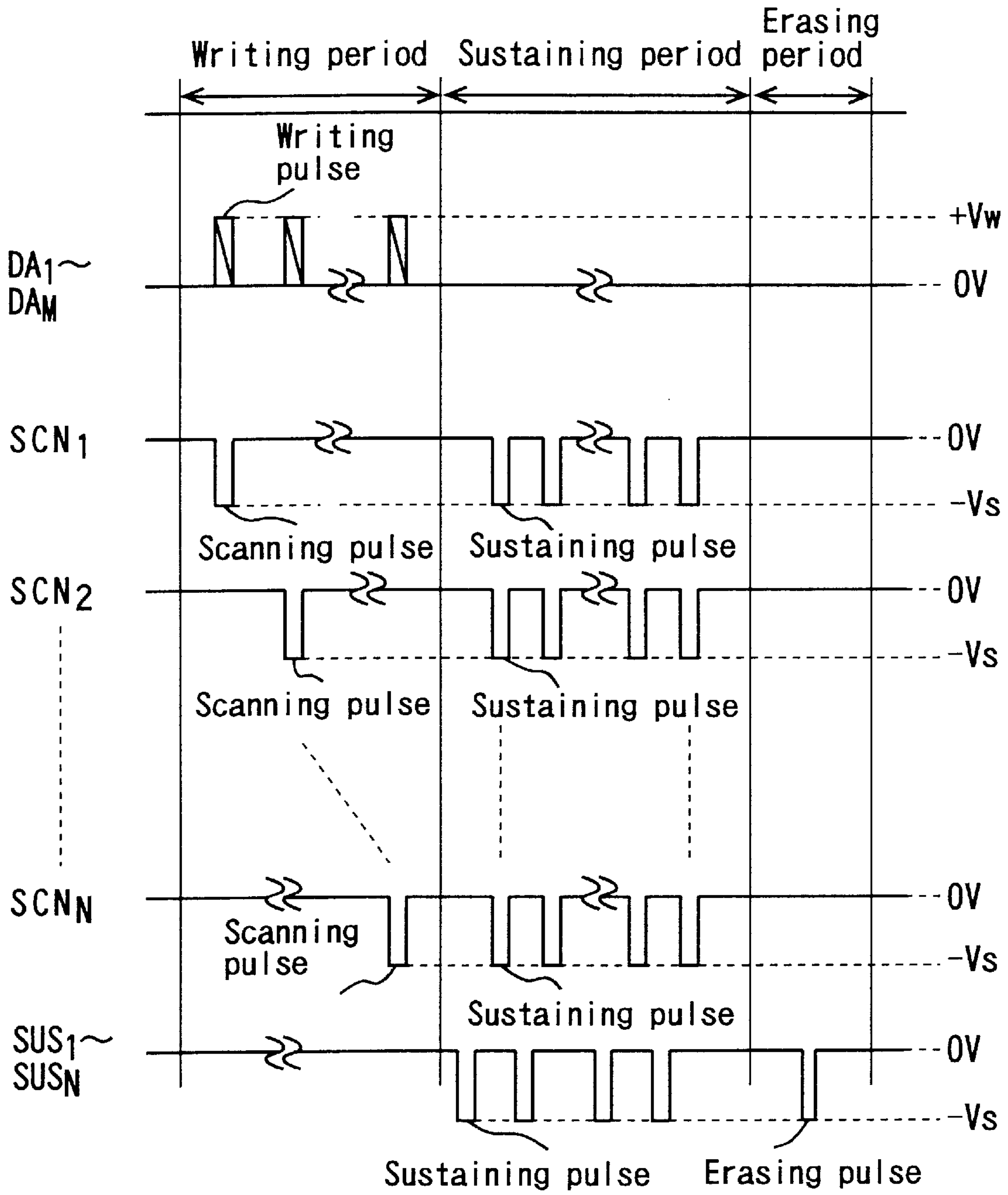
F I G. 33 (Prior Art)
FIG. 33 is a time chart showing timings of voltage pulses applied to the respective electrodes in the AC-type PDP.

As shown in FIG. 1, a field period (1/60 second) of the TV display method is divided into nine sub-fields Sub5, Sub6, Sub8*a*, Sub7, Sub8*b*, Sub1, . . . , and Sub4 with respect to time. Furthermore, each of emission display in the nine sub-fields Sub5, Sub6, Sub8*a*, Sub7, Sub8*b*, Sub1, . . . , and Sub4 is selectively performed in that order. Thereby, the gray scale expression having $2^8$ (=256) gray scales is performed every 1/60 second. Each of the nine sub-fields Sub5, Sub6, Sub8*a*, Sub7, Sub8*b*, Sub1, . . . , and Sub4 consists of the sequence of a writing period, a sustaining period, and an erasing period shown in FIG. 33.

Figure 34:
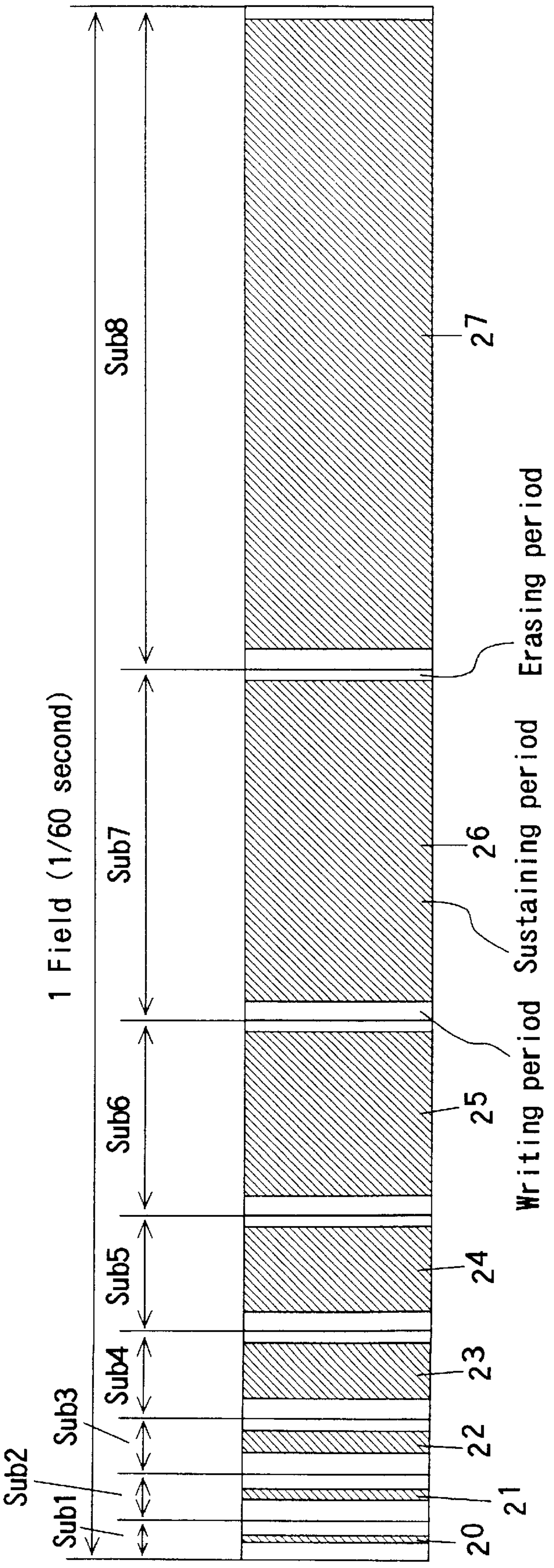
FIG. 34 (Prior Art)
FIG. 34 is an explanatory view showing an arrangement of plural sub-fields in a first conventional display device driving for the gray scale expression.
Figure 37:
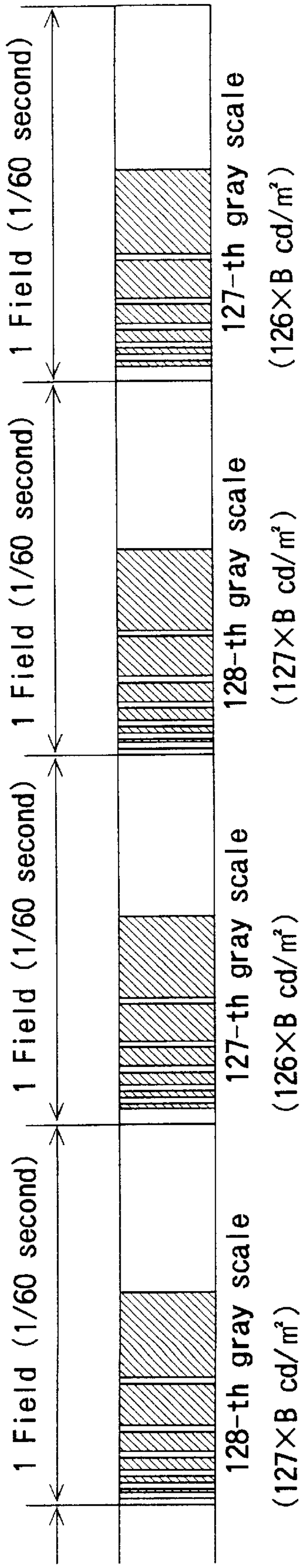
FIG. 37 (Prior Art)
FIG. 37 is a diagram showing a timing of the display when 128-th gray scale (127×B cd/$m^2$) and 127-th gray scale (126×B cd/$m^2$) are alternately and repeatedly displayed every one field in the first conventional display device driving.
Figure 38:
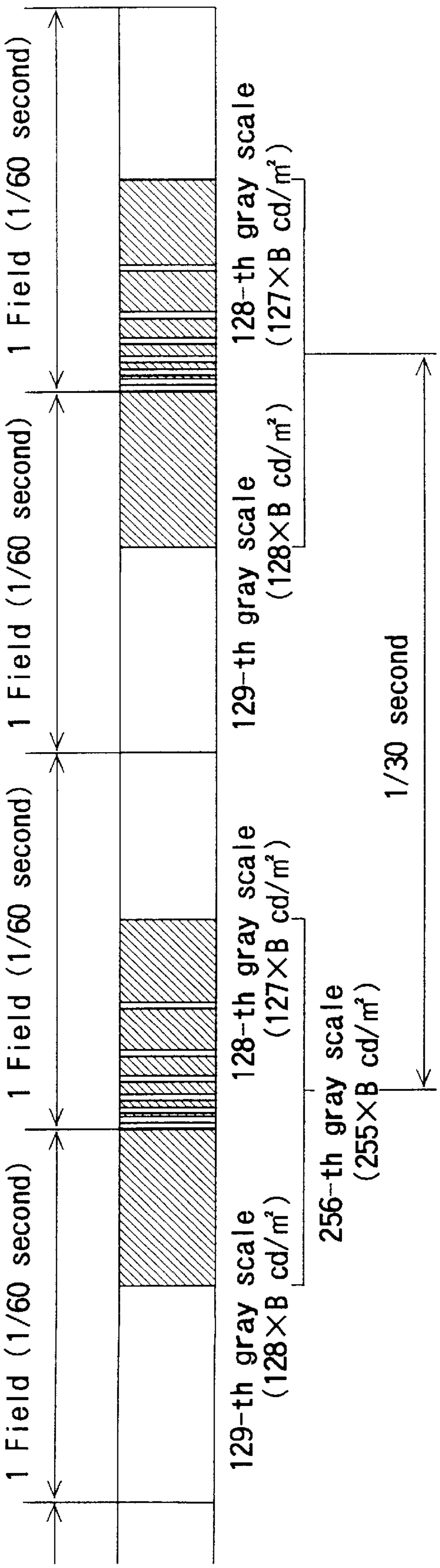
FIG. 38 (Prior Art)
FIG. 38 is a diagram showing a timing of the display when 129-th gray scale (128×B cd/$m^2$) and the 128-th gray scale (127×B cd/$m^2$) are alternately and repeatedly displayed every one field in the first conventional display device driving.

The driving method of the first embodiment is characterized by the following two points (1) and (2):

(1) The sub-field Sub8 having the highest luminance value in the field in the conventional driving method shown by FIG. 34 is divided into the two sub-fields Sub8*a* and Sub8*b*, which are disposed apart from each other.

(2) These two sub-fields Sub8*a* and Sub8*b* are disposed before and after the sub-field Sub7, and the sub-field Sub 5 is disposed as the first sub-field.

FIG. 2 is a table showing a relation between luminance and the nine sub-fields of FIG. 1.

In FIG. 2, each of the sustaining period is set in the nine sub-fields Sub5, Sub6, . . . , and Sub4 so that their display screens have luminance values obtained by multiplying the values shown in the luminance column of FIG. 2 by a unit luminance B (cd/$m^2$). The luminance values of the sub-fields Sub8*a* and Sub8*b* are each set at (½)x$2^7$.

A concrete method of attaining the 256 gray scales in the first embodiment is shown in FIG. 3.

FIG. 3 is a table showing a concrete method of attaining 256 gray scales in the first embodiment of the present invention.

In FIG. 3, ON designates a sub-field which performs the displaying operation, and OFF designates a sub-field which does not perform the displaying operation.

As shown in FIG. 3, the display screen having the 256 gray scales can be obtained by combining the ON and OFF states of the nine sub-fields Sub5, Sub6, Sub8*a*, Sub7, Sub8*b*, Sub1, . . . , and Sub4 in various patterns, wherein the 256 gray scales are in the range from a first gray scale (luminance 0) caused by the OFF states of all sub-fields to 256-th gray scale (luminance 255×B) caused by the ON states of all sub-fields.

In FIG. 3, the sub-fields Sub8*a* and Sub8*b* perform the same display operations so as to display the same display contents. Furthermore, the luminance values of the nine sub-fields Sub1, Sub2, . . . , Sub7, Sub8*a* and Sub8*b* are set at $2^0$×B, $2^1$×B, . . . , $2^6$×B, ½$2^7$×B and ½x$2^7$×B (cd/$m^2$), respectively. The total of the luminance values at each gray scale is shown in luminance column. In FIG. 3, the total of the luminance values of the sub-fields Sub8*a* and Sub8*b* is $2^7$×B (cd/$m^2$), and this value is the same as that of the sub-field Sub8 (FIG. 34) in the conventional driving method.

The following description offers an explanation of the gray scale expression in continuous fields using in the actual image display of TV or the like.

Figure 4:
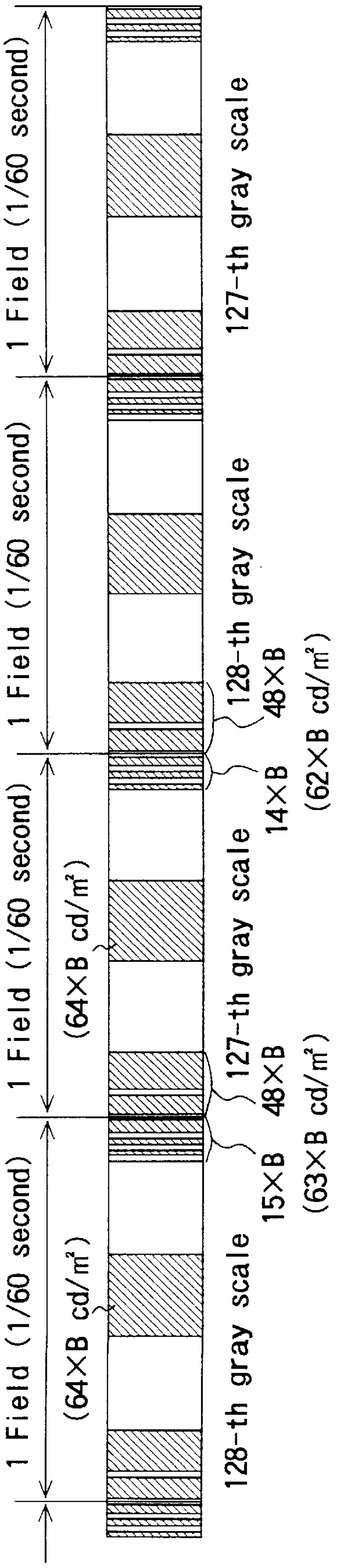
FIG. 4 is a diagram showing a timing of the display when 128-th gray scale (127×B cd/m$^2$) and 127-th gray scale (126×B cd/m$^2$) are alternately and repeatedly displayed every one field in the first embodiment of the present invention.
Figure 5:
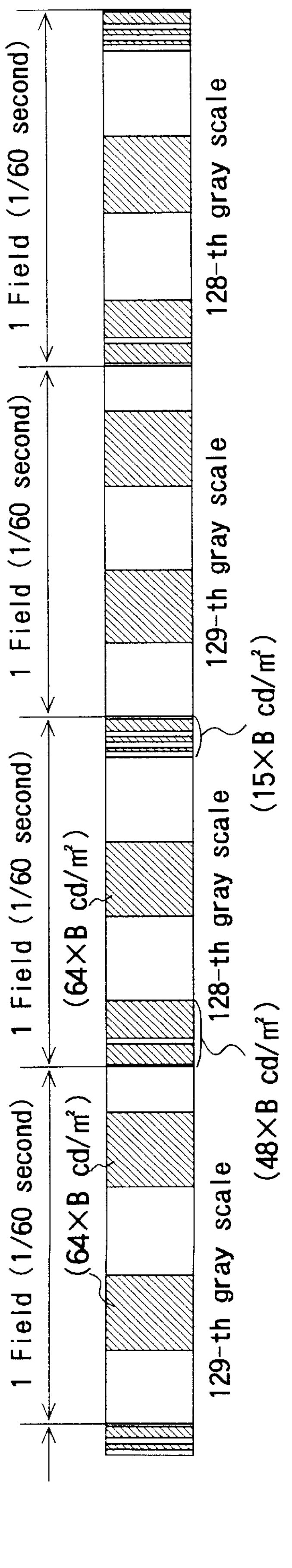
FIG. 5 is a diagram showing a timing of the display when 129-th gray scale (128×B cd/m$^2$) and the 128-th gray scale (127×B cd/m$^2$) are alternately and repeatedly displayed every one field in the first embodiment of the present invention.

FIG. 4 and FIG. 5 are diagrams showing a timing of the displays when the image display are continuously performed by the driving method of the first embodiment so that luminance of the display screen changes by only one gray scale every the field. FIG. 4 is a diagram showing a timing of the display when 128-th gray scale (127×B cd/$m^2$) and 127-th gray scale (126×B cd/$m^2$) are alternately and repeatedly displayed every the field in the first embodiment of the present invention. FIG. 5 is a diagram showing a timing of the display when 129-th gray scale (128×B cd/$m^2$) and the 128-th gray scale (127×B cd/$m^2$) are alternately and repeatedly displayed every the field in the first embodiment of the present invention.

As shown in FIG. 4, the 127-th gray scale (126×B cd/$m^2$) is divided and displayed into a first portion (48×B cd/$m^2$ in total) disposed at a front end part of the field, a second portion (64×B cd/$m^2$) disposed at the center part of the field, and a third portion (14×B cd/$m^2$ in total) disposed at a rear end part of the field. As shown in FIG. 4 and FIG. 5, the 128-th gray scale (127×B cd/$m^2$) is divided and displayed into a fourth portion (48×B cd/$m^2$ in total) disposed at the front end part of the field, a fifth portion (64×B cd/$m^2$) disposed at the center part of the field, and a sixth portion (15×B cd/$m^2$ in total) disposed at the rear end part of the field.

As shown in FIG. 5, the 129-th gray scale (128×B cd/$m^2$) is divided into a first half portion (64×B cd/$m^2$), and a second half portion (64×B cd/$m^2$). These first and second half portions are discontinuously displayed with each other.

In FIG. 4, when the 127-th gray scale (126×B cd/$m^2$) and the 128-th gray scale (127×B cd/$m^2$) are alternately and repeatedly displayed every one field (1/60 second) in the continuous fields, the sixth portion (15×B cd/$m^2$) is added to the first portion (48×B cd/$m^2$). Thereby, the sixth portion (15×B cd/$m^2$) and the first portion (48×B cd/$m^2$) are displayed as a seventh portion (63=15+48 B cd/$m^2$). Furthermore, the third portion (14×B cd/$m^2$) is added to the fourth portion (48×B cd/$m^2$). Thereby, the third portion (14×B cd/$m^2$) and the fourth portion (48×B cd/$m^2$) are displayed as an eighth portion (62=14+48 B cd/$m^2$).

As a result, in the case that the 127-th gray scale and the 128-th gray scale are alternately and repeated displayed every one field, the seventh, the second, the eighth, and the fifth portions are displayed in that order.

On the other hand, in FIG. 5, the 129-th gray scale (128×B cd/$m^2$) is divided and displayed into the first half and the second half portions (64×B cd/$m^2$). This condition is equivalent to the condition wherein a field period is shortened to ½ of 1/60 second. Furthermore, the 128-th gray scale (127×B cd/$m^2$) is divided and displayed into the fourth portion (48×B cd/$m^2$), the fifth portion (64×B cd/$m^2$), and the sixth portion (15×B cd/$m^2$). This condition is equivalent to the condition wherein a field period is shortened to ⅓ of 1/60 second.

As a result, time interval in which the luminance changes is shortened. The change of luminance appears to be averaged on the display screen, since the human eyes have slow response speed. Thereby, accurate gray scale expression can be attained without causing flicker noise.

This accurate gray scale expression without the flicker noise can be attained because of the following configurational reasons. The sub-field Sub8 having the highest luminance is divided into two parts of the sub-fields Sub8*a* and the Sub8*b*. In addition, these parts of the sub-fields Sub8*a* and the Sub8*b* are separately or dispersedly disposed in the center part of the field period. Thereby, the displays of the sub-fields are nearly evenly dispersed in continuous fields.

In the explanation of the above-mentioned example wherein an AC-type PDP is taken as an example, the sub-field Sub8 having the highest luminance value is divided into two parts of the sub-fields Sub8*a* and the Sub8*b*. Furthermore, the sub-field Sub5 is disposed first position in the field period in order to separately dispose the two parts of the sub-fields Sub8*a* and the Sub8*b* in the center part of the field period. However, the configuration of the field period can be applied to other display device. That is, in the case of a display device having only one emission displaying period corresponded to the sustaining period, the same effect can be obtained by dividing the sub-field having the highest luminance value, and by separately disposing these divided parts in the center part of the field period.

Furthermore, the luminance values of the sub-fields Sub8*a* and Sub8*b* are set to have the same value, namely, (½)×$2^7$×B (cd/$m^2$) in the case of the above-mentioned example. However, it is not always necessary to equally divide the luminance. That is, it is passable that the total of the luminance values of the sub-fields Sub8*a* and Sub8*b* is $2^7$×B (cd/$m^2$).

Moreover, apart from the aforementioned explanation, wherein the sub-field Sub8 is divided into two sub-fields of the Sub8*a* and the Sub8*b*, an alternative construction may be such that the sub-field Sub8 can also be divided into three or more sub-field parts.

Figure 6:
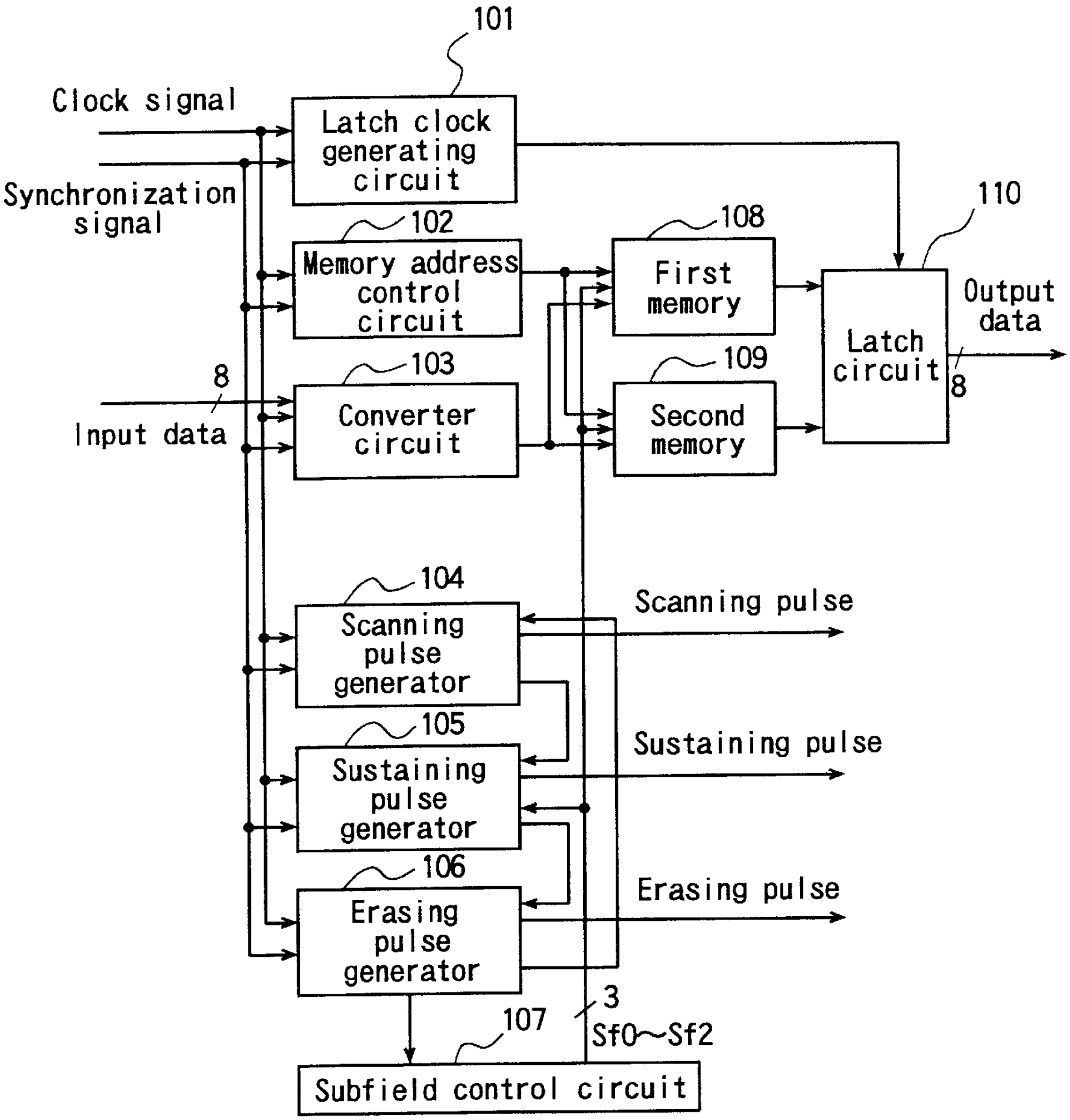
FIG. 6 is a circuit diagram showing a driving circuit of the first embodiment of the present invention.

FIG. 6 is a circuit diagram showing a driving circuit of the first embodiment of the present invention.

In FIG. 6, a clock signal and a synchronization signal are supplied to a latch clock generating circuit 101, a memory address control circuit 102, a converter circuit 103 for PDP data, a scanning pulse generator 104, a sustaining pulse generator 105, and an erasing pulse generator 106. In a first and a second memories 108 and 109, writing addresses are designated by the memory address control circuit 102.

The converter circuit 103 converts a data input signal, namely, an ordinary video signal, into data for a PDP. The converted data is written once in the first and the second memories 108 and 109. Data at an address corresponding to sub-field signals f0 to Sf2 supplied from a sub-field control circuit 107 is output to a latch circuit 110. The latch circuit 110 latches the above-mentioned data in accordance with a latch signal from the latch clock generating circuit 101, and outputs the data as a data output signal to the PDP.

The scanning pulse generator 104, the sustaining pulse generator 105, and the erasing pulse generator 106 generate the scanning pulse, the sustaining pulse, and the erasing pulse shown in FIG. 15, respectively. The generation start timing of the sustaining pulse is given by a scanning pulse end signal from the scanning pulse generator 104. The generation timing of the erasing pulse is given by a sustaining pulse end signal from the sustaining pulse generator 105. In addition, the generation timing of the next scanning pulse is given by an erasing pulse end signal from the erasing pulse generator 106. Furthermore, the erasing pulse end signal is also supplied to the sub-field control circuit 107, so that the sub-field control circuit 107 outputs the sub-field signals Sf0 to Sf2 corresponding to the next sub-field to the first and the second memories 108 and 109.

FIG. 7 is a table showing a relation among the sub-field, the sub-field signal, and number of the sustaining pulse in the first embodiment of the present invention.

As has been explained in the above, only the selected sub-fields are turned ON in a sequence of the nine sub-fields from Sub5 to Sub4. The sub-field signals Sf0 to Sf2 are three-bit signals, and are used to specify sub-fields as shown in FIG. 7. The sub-field control circuit 107 outputs the sub-field signals Sf0 to Sf2 corresponding to the selected sub-fields at a predetermined timing in accordance with the ON/OFF combination (FIG. 3) of the sub-fields corresponding to a desired gray scale.

In the first and the second memories 108 and 109, the data (corresponding to writing pulses) of the corresponding sub-field is stored at the address (e.g., address (100) in the case of the sub-field Sub5) designated by the sub-field signals Sf0 to Sf2. The stored data is thus delivered to the latch circuit 110.

On the other hand, the sustaining pulse generator 105 (FIG. 6) receives the sub-field signals Sf0 to Sf2, and outputs the sustaining pulse at the number of which corresponds to the sub-field signals Sf0 to Sf2 as shown in FIG. 7. Accordingly, the sustaining pulse of the required number is output in order to display the sub-field specified by the sub-field signals Sf0 to Sf2, thereby offering the arrangement of the nine sub-fields shown in FIG. 1.

<Embodiment 2>

Figure 8:
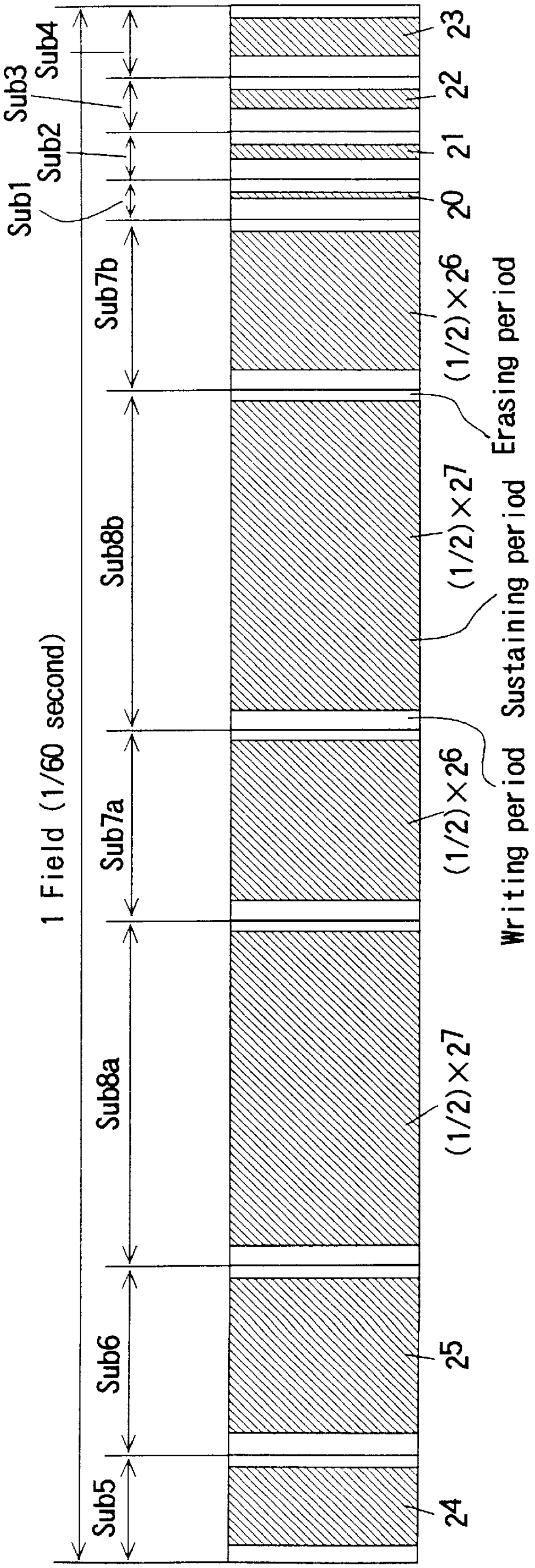
FIG. 8 is an explanatory view showing an arrangement of plural sub-fields in a display device driving for a gray scale expression in a second embodiment of the present invention.

FIG. 8 is an explanatory view showing an arrangement of plural sub-fields in a display device driving for a gray scale expression in a second embodiment of the present invention.

In a second embodiment, the sub-field Sub8 in the conventional embodiment shown in FIG. 34 is divided into sub-fields Sub8*a* and Sub8*b*, and the sub-field Sub7 shown in FIG. 34 is also divided into sub-fields Sub7*a* and Sub7*b*. These sub-fields of the Sub8*a*, Sub7*a*, Sub8*b*, and Sub7*b* are disposed separated in the order at the center part of the field period. Accordingly, ten sub-fields are formed in the field period of 1/60 second as a whole.

FIG. 9 is a table showing a relation between luminance and the ten sub-fields of FIG. 8.

In FIG. 9, each of the sustaining period is set in the ten sub-fields Sub5, Sub6, . . . , Sub4 so that their display screens have luminance values obtained by multiplying the values shown in the luminance column of FIG. 9 by the unit luminance B (cd/$m^2$). The luminance values of the sub-fields Sub7*a* and Sub7*b* are each set at (½)x$2^6$×B, and the total of the luminance values is $2^6$×B. In addition, the luminance values of the sub-fields Sub8*a* and Sub8*b* are each set at (½)x$2^7$×B, and the total of the luminance values is $2^7$×B.

With this arrangement of the ten sub-fields, the emission display of the AC-type PDP is performed by controlling the sub-fields. More specifically, as shown in the table of FIG. 10, the AC-type PDP can have the 256 gray scale expression ranging from the first gray scale to the 256-th gray scale by combining the ON and OFF states of the ten sub-fields Sub5, Sub6, Sub8*a*, Sub7*a*, Sub8*b*, Sub7*b*, Sub1, Sub2, Sub3, and Sub4. The sub-fields Sub7*a* and Sub7*b* perform the same display operations so as to display the same content. Furthermore, the sub-fields Sub8*a* and Sub8*b* also perform the same display operations so as to display the same content. In FIG. 10, the luminance values of the ten sub-fields Sub1, Sub2, Sub6, Sub7*a*, Sub7*b*, Sub8*a*, and Sub8*b* are set at $2^0$×B, $2^1$×B, . . . , $2^5$×B, ½x$2^6$×B, ½x$2^6$×B, ½x$2^7$×B, and ½x$2^7$ B (cd/$m^2$), respectively.

The following description offers an explanation of the gray scale expression in the continuous fields using in the actual image display of TV or the like.

Figure 11:
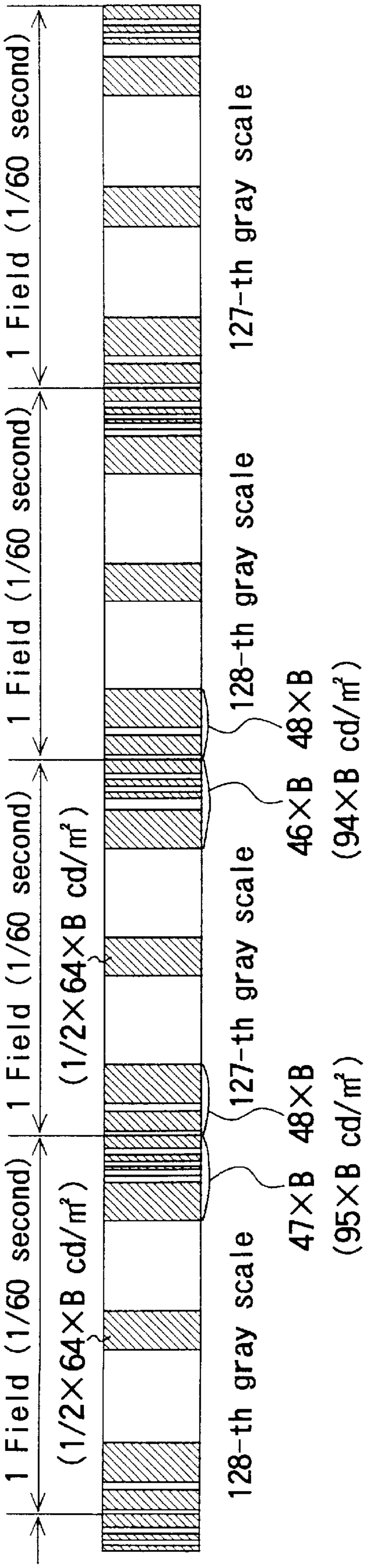
FIG. 11 is a diagram showing a timing of the display when the 128-th gray scale (127×B cd/m$^2$) and the 127-th gray scale (126×B cd/m$^2$) are alternately and repeatedly displayed every one field in the second embodiment of the present invention.
Figure 12:
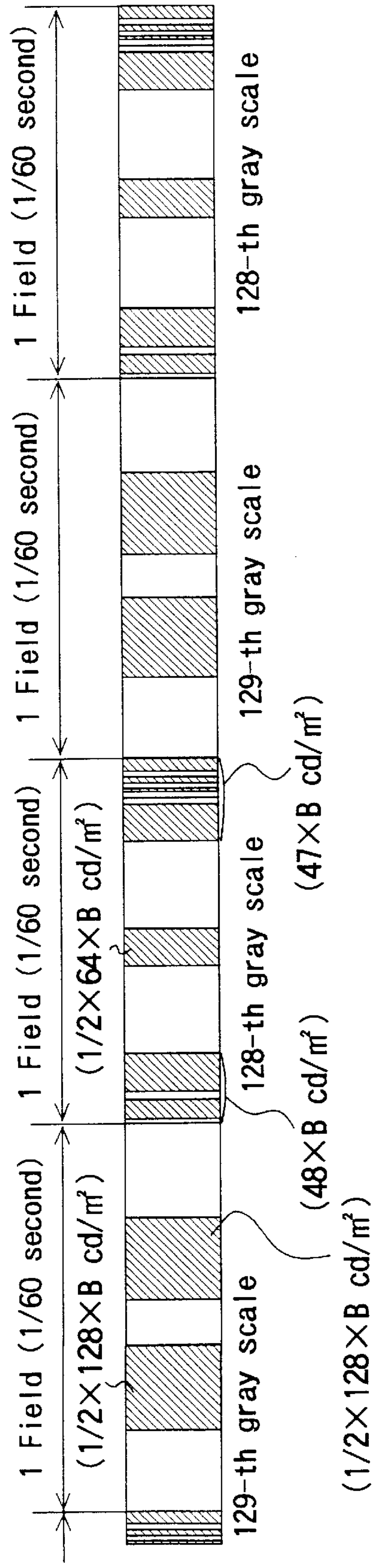
FIG. 12 is a diagram showing a timing of the display when the 129-th gray scale (128×B cd/m$^2$) and the 128-th gray scale (127×B cd/m$^2$) are alternately and repeatedly displayed every one field in the second embodiment of the present invention.

FIG. 11 and FIG. 12 are diagrams showing a timing of the displays when the image display are continuously performed by the driving method of the second embodiment so that luminance of the display screen changes by only one gray scale every one field. FIG. 11 is a diagram showing a timing of the display when the 128-th gray scale (127×B cd/$m^2$) and the 127-th gray scale (126×B cd/$m^2$) are alternately and repeatedly displayed every one field in the second embodiment of the present invention. FIG. 12 is a diagram showing a timing of the display when the 129-th gray scale (128×B cd/$m^2$) and the 128-th gray scale (127×B cd/$m^2$) are alternately and repeatedly displayed every one field in the second embodiment of the present invention.

As shown in FIG. 11, the 127-th gray scale (126×B cd/$m^2$) is divided and displayed into a ninth portion (48×B cd/$m^2$ in total) disposed at the front end part of the field, a tenth portion (½x64×B cd/$m^2$) disposed at the center part of the field, and an 11-th portion (46×B cd/$m^2$ in total) disposed at the rear end part of the field. As shown in FIG. 11 and FIG. 12, the 128-th gray scale (127×B cd/$m^2$) is divided and displayed into a 12-th portion (48×B cd/$m^2$ in total) disposed at the front end part of the field, a 13-th portion (½x64×B cd/$m^2$) disposed at the center part of the field, and a 14-th portion (47×B cd/$m^2$ in total) disposed at the rear end part of the field. As shown in FIG. 12, the 129-th gray scale (128×B cd/$m^2$) is divided and displayed into a 15-th portion (½x128×B cd/$m^2$), and a 16-th portion (½x128×B cd/$m^2$).

In FIG. 11, when the 127-th gray scale (126×B cd/$m^2$) and the 128-th gray scale (127×B cd/$m^2$) are alternately and repeatedly displayed every one field (1/60 second) in the continuous fields, the 14-th portion (47×B cd/$m^2$) is added to the ninth portion (48×B cd/$m^2$). Thereby, the 14-th portion (47×B cd/$m^2$) and the ninth portion (48×B cd/$m^2$) are displayed as a 17-th portion (95=47+48 B cd/$m^2$). Furthermore, the 11-th (46×B cd/$m^2$) is added to the 12-th portion (48×B cd/$m^2$). Thereby, the 11-th portion (46×B cd/$m^2$) and the 12-th portion (48×B cd/$m^2$) are displayed as an 18-th portion (94=46+48 B cd/$m^2$).

As a result, in the case that the 127-th gray scale and the 128-th gray scale are alternately and repeated displayed every one field, the 17-th, the tenth, the 18-th, and the 13-th portions are displayed in that order.

On the other hand, in FIG. 12, the 129-th gray scale (128×B cd/$m^2$) is divided and displayed into the 15-th and the 16-th portions (½x128×B cd/$m^2$). This condition is equivalent to the condition wherein a field period is shortened to ½ of 1/60 second. Furthermore, the 128-th gray scale (127×B cd/$m^2$) is divided and displayed into the 12-th portion (48×B cd/$m^2$), the 13-th portion (½x64×B cd/$m^2$), and the 14-th portion (46×B cd/$m^2$). This condition is equivalent to the condition wherein a field period is shortened to ⅓ of 1/60 second.

As a result, time interval in which the luminance changes is shortened. The change of luminance appears to be averaged on the display screen, since the human eyes have slow response speed. Thereby, accurate gray scale expression can be attained without causing flicker noise.

This accurate gray scale expression without the flicker noise can be attained because of the following configurational reasons. The sub-field Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. In addition, these parts of the sub-fields Sub8*a*, Sub8*b*, Sub7*a*, and Sub7*b* are separately disposed in the center part of the field period. Thereby, the displays of the sub-fields are nearly evenly dispersed in continuous fields.

In this second embodiment, a driving circuit for forming the field shown in FIG. 8 is the same of the first embodiment shown in FIG. 6. As shown in FIG. 13 there is difference from the first embodiment shown in FIG. 7 that the sub-field Sub7 is divided into sub-fields Sub7*a* and Sub7*b*.

In the above explanation of the second embodiment wherein the AC-type PDP is taken as an example, the sub-fields Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. In addition, in order to dispose these parts of Sub8*a*, Sub8*b*, Sub7*a*, and Sub7*b* separately in the center part of the field period, the sub-field Sub5 is disposed at the first position in the field. However, the configuration of the field period can be applied to other display device. That is, in the case of the display device having only one emission displaying period corresponded to the sustaining period, the same effect can be obtained by dividing the above-mentioned arrangement of the ten sub-fields.

Furthermore, in the above-mentioned embodiment, the luminance values of the sub-fields Sub8*a* and Sub8*b* are set at the same value of $(½)\times2^7\times B$ (cd/m$^2$), and the luminance values of the sub-fields Sub7*a* and Sub7*b* are also set at the same value of $(½)\times2^6\times B$ (cd/m$^2$). However, it is not always necessary to equally divide the respective luminance values of the Sub7 and the Sub8. In other words, it is only required that the total of the luminance values of the sub-fields Sub8*a* and Sub8*b* is $2^7\times B$ (cd/m$^2$), and that the total of the luminance values of the sub-fields Sub7*a* and Sub7*b* is $2^6\times B$ (cd/m$^2$).

Moreover, in the second embodiment, the sub-fields Sub7 and Sub8 are each divided into two sub-fields of the Sub7*a*, the Sub7*b*, and the Sub8*a*, the Sub8*b*, respectively. However, one or both of the sub-fields Sub7 and Sub8 can be divided into three or more sub-field parts.

<Embodiment 3>

Figure 14:
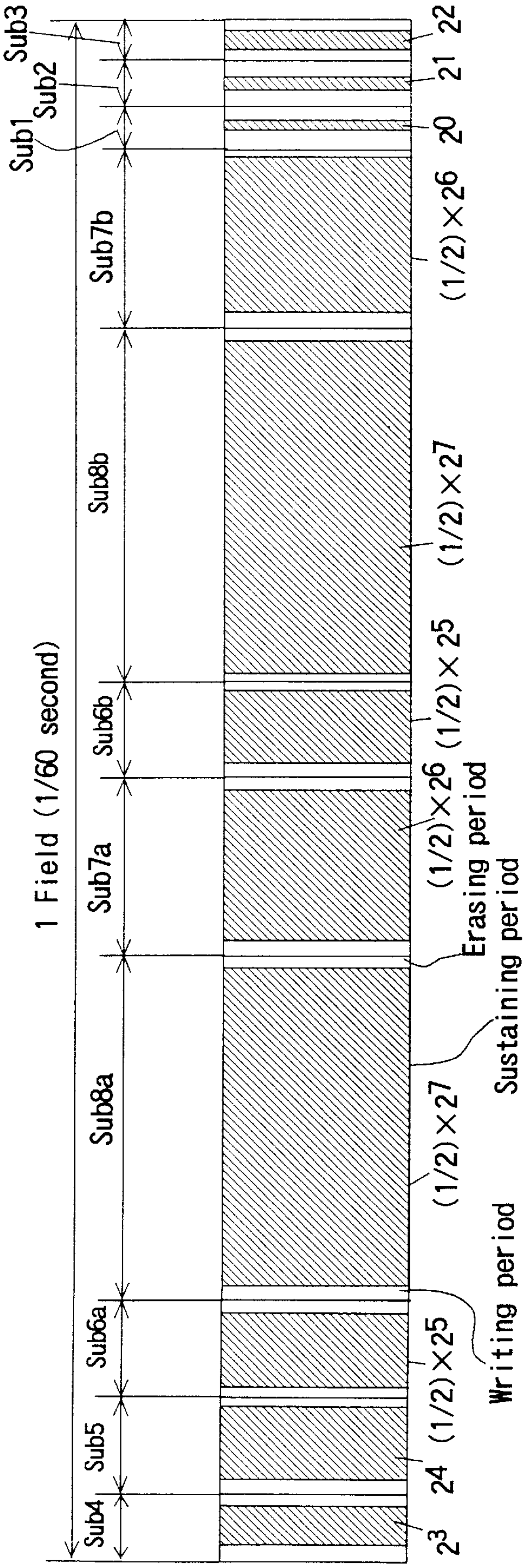
FIG. 14 is an explanatory view showing an arrangement of plural sub-fields in a display device driving for a gray scale expression in a third embodiment of the present invention.

FIG. 14 is an explanatory view showing an arrangement of plural sub-fields in a display device driving for a gray scale expression in a third embodiment of the present invention.

In a third embodiment, the sub-field Sub8 in the conventional embodiment shown in FIG. 34 is divided into sub-fields Sub8*a* and Sub8*b*, and the sub-field Sub7 shown in FIG. 34 is also divided into sub-fields Sub7*a* and Sub7*b*. Furthermore, the sub-field Sub6 in the conventional embodiment shown in FIG. 34 is divided into sub-fields Sub6*a* and Sub6*b*. These sub-fields of the Sub6*a*, Sub8*a*, Sub7*a*, Sub6*b*, Sub8*b*, and Sub7*b* are disposed in the order at the center part of the field period. In addition, eleven sub-fields of the Sub4, Sub5, Sub6*a*, Sub8*a*, Sub7*a*, Sub6*b*, Sub8*b*, Sub7*b*, Sub1, Sub2, and Sub3 are disposed in the order in the field period of 1/60 second as a whole.

FIG. 15 is a table showing a relation between luminance and the eleven sub-fields of FIG. 14.

In FIG. 15, each of the sustaining period is set in the eleven sub-fields Sub4, Sub5, . . . , Sub3 so that their display screens have luminance values obtained by multiplying the values shown in the luminance column of FIG. 15 by the unit luminance B (cd/m$^2$). The luminance values of the sub-fields Sub6*a* and Sub6*b* are each set at $(½)\times2^5\times B$, and the total of the luminance values is $2^5\times B$. The luminance values of the sub-fields Sub7*a* and Sub7*b* are each set at $(½)\times2^6\times B$, and the total of the luminance values is $2^6\times B$. In addition, the luminance values of the sub-fields Sub8*a* and Sub8*b* are each set at $(½)\times2^7\times B$, and the total of the luminance values is $2^7\times B$.

With this arrangement of the eleven sub-fields, the emission display of the AC-type PDP is performed by controlling the sub-fields. More specifically, as shown in the table of FIG. 16, the AC-type PDP can have the 256 gray scale expression ranging from the first gray scale to the 256-th gray scale by combining the ON and OFF states of the eleven sub-fields Sub4, Sub5, Sub6*a*, Sub8*a*, Sub7*a*, Sub6*b*, Sub8*b*, Sub7*b*, Sub1, Sub2, and Sub3. The sub-fields Sub6*a* and Sub6*b* perform the same display operations so as to display the same content. The sub-fields Sub7*a* and Sub7*b* perform the same display operations so as to display the same content. Furthermore, the sub-fields Sub8*a* and Sub8*b* also perform the same display operations so as to display the same content. In FIG. 16, the luminance values of the eleven sub-fields Sub1, Sub2, . . . , Sub6*a*, Sub6*b*, Sub7*a*, Sub7*b*, Sub8*a*, and Sub8*b* are set at $2^0\times B$, $2^1\times B$, . . . , $½\times2^5\times B$, $½\times2^5\times B$, $½\times2^6\times B$, $½\times2^6\times B$, $½\times2^7\times B$, and $½\times2^7$ B (cd/m$^2$), respectively.

The following description offers an explanation of the gray scale expression in the continuous fields using in the actual image display of TV or the like.

Figure 17:
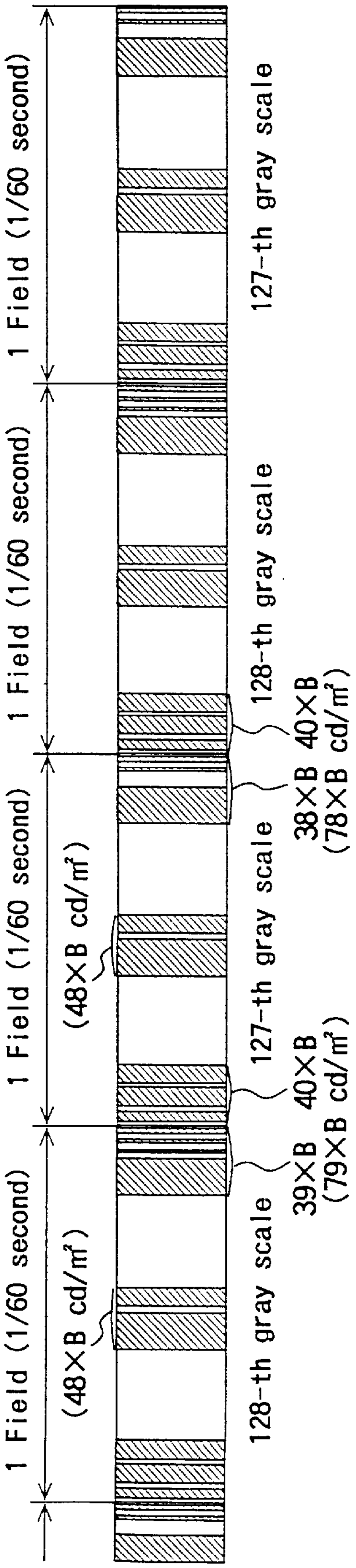
FIG. 17 is a diagram showing a timing of the display when the 128-th gray scale (127×B cd/m$^2$) and the 127-th gray scale (126×B cd/m$^2$) are alternately and repeatedly displayed every one field in the third embodiment of the present invention.
Figure 18:
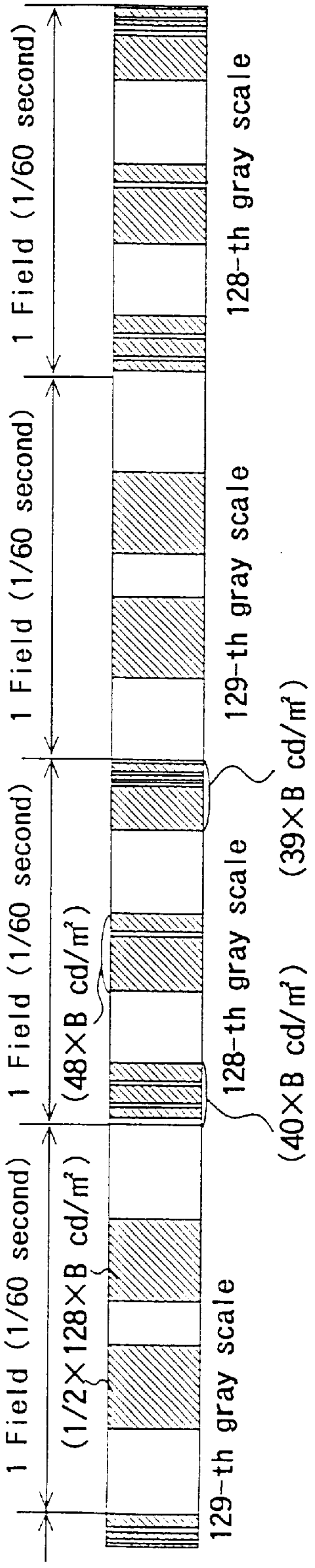
FIG. 18 is a diagram showing a timing of the display when the 129-th gray scale (128×B cd/m$^2$) and the 128-th gray scale (127×B cd/m$^2$) are alternately and repeatedly displayed every one field in the third embodiment of the present invention.

FIG. 17 and FIG. 18 are diagrams showing a timing of the displays when the image display are continuously performed by the driving method of the third embodiment so that luminance of the display screen changes by only one gray scale every one field. FIG. 17 is a diagram showing a timing of the display when the 128-th gray scale (127×B cd/m$^2$) and the 127-th gray scale (126×B cd/m$^2$) are alternately and repeatedly displayed every one field in the third embodiment of the present invention. FIG. 18 is a diagram showing a timing of the display when the 129-th gray scale (128×B cd/m$^2$) and the 128-th gray scale (127×B cd/m$^2$) are alternately and repeatedly displayed every one field in the third embodiment of the present invention.

As shown in FIG. 17, the 127-th gray scale (126×B cd/m$^2$) is divided and displayed into a 19-th portion (40×B cd/m$^2$ in total) disposed at the front end part of the field, a 20-th portion (48×B cd/m$^2$) disposed at the center part of the field, and a 21-th portion (38×B cd/m$^2$ in total) disposed at the rear end part of the field. As shown in FIG. 17 and FIG. 18, the 128-th gray scale (127×B cd/m$^2$) is divided and displayed into a 22-th portion (40×B cd/m$^2$ in total) disposed at the front end part of the field, a 23-th portion (48×B cd/m$^2$) disposed at the center part of the field, and a 24-th portion (39×B cd/m$^2$ in total) disposed at the rear end part of the field. As shown in FIG. 18, the 129-th gray scale (128×B cd/m$^2$) is divided and displayed into the 15-th portion (½×128×B cd/m$^2$), and the 16-th portion (½×128×B cd/m2).

In FIG. 17, when the 127-th gray scale (126×B cd/m$^2$) and the 128-th gray scale (127×B cd/m$^2$) are alternately and repeatedly displayed every one field (1/60 second) in the continuous fields, the 24-th portion (39×B cd/m$^2$) is added to the 19-th portion (40×B cd/m$^2$). Thereby, the 24-th portion (39×B cd/m$^2$) and the 19-th portion (40×B cd/m$^2$) are displayed as a 25-th portion (79=39+40 B cd/m$^2$). Furthermore, the 21-th portion (38×B cd/m$^2$) is added to the 22-th portion (40×B cd/m$^2$). Thereby, the 21-th portion (38×B cd/m$^2$) and the 22-th portion (40×B cd/m$^2$) are displayed as a 26-th portion (78=38+40 B cd/m$^2$).

As a result, in the case that the 127-th gray scale and the 128-th gray scale are alternately and repeated displayed every one field, the 25-th, the 20-th, the 26-th, and the 23-th portions are displayed in that order.

On the other hand, in FIG. 18, the 129-th gray scale (128×B cd/m$^2$) is divided and displayed into the 15-th and the 16-th portions (½×128×B cd/m$^2$). This condition is equivalent to the condition wherein a field period is shortened to ½ of 1/60 second. Furthermore, the 128-th gray scale (127×B cd/m$^2$) is divided and displayed into the 22-th portion (40×B cd/m$^2$), the 23-th portion (48×B cd/m$^2$), and the 24-th portion (39×B cd/m$^2$). This condition is equivalent to the condition wherein a field period is shortened to ⅓ of 1/60 second.

As a result, time interval in which the luminance changes is shortened. The change of luminance appears to be averaged on the display screen, since the human eyes have slow response speed. Thereby, accurate gray scale expression can be attained without causing flicker noise.

This accurate gray scale expression without the flicker noise can be attained because of the following configurational reasons. The sub-field Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. Moreover, the sub-field Sub6 having the third highest luminance value is divided into two parts of the sub-fields Sub6*a* and the Sub6*b*. In addition, these parts of the sub-fields Sub8*a*, Sub8*b*, Sub7*a*, Sub7*b*, Sub6*a*, and Sub6*b* are separately disposed in the center part of the field period. Thereby, the displays of the sub-fields are nearly evenly dispersed in continuous fields.

In this third embodiment, a driving circuit for forming the field shown in FIG. 14 is the same of the first embodiment shown in FIG. 6. As shown in FIG. 19 there is difference from the first embodiment shown in FIG. 7 that the sub-fields Sub6, Sub7 and Sub8 are divided into sub-fields Sub6*a* and Sub6*b*, Sub7*a* and Sub7*b*, and Sub8*a* and Sub8*b*, respectively.

In the above explanation of the third embodiment wherein the AC-type PDP is taken as an example, the sub-fields Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. Moreover, the sub-field Sub6 having the third highest luminance value is divided into two parts of the sub-fields Sub6*a* and the Sub6*b*. In addition, the eleven sub-fields of the Sub4, Sub5, Sub6*a*, Sub8*a*, Sub7*a*, Sub6*b*, Sub8*b*, Sub7*b*, Sub1, Sub2, and Sub3 are disposed in the order in the field period of 1/60 second. However, the configuration of the field period can be applied to other display device. That is, in the case of the display device having only one emission displaying period corresponded to the sustaining period, the same effect can be obtained by dividing the above-mentioned arrangement of the eleven sub-fields.

Furthermore, in the above-mentioned embodiment, the luminance values of the sub-fields Sub6*a* and Sub6*b* are set at the same value of $(\frac{1}{2})\times2^5\times$x B (cd/m$^2$). However, it is not always necessary to equally divide the respective luminance values of the Sub6. In other words, it is only required that the total of the luminance values of the sub-fields Sub6*a* and Sub6*b* is $2^5\times$B (cd/m$^2$).

Moreover, in the third embodiment, the sub-fields Sub6, Sub7 and Sub8 are each divided into two sub-fields of the Sub6*a*, the Sub6*b*, the Sub7*a*, the Sub7*b*, and the Sub8*a*, the Sub8*b* respectively. However, one or both of the sub-fields Sub6, Sub7 and Sub8 can be divided into three or more sub-field parts.

<Embodiment 4>

Figure 20:
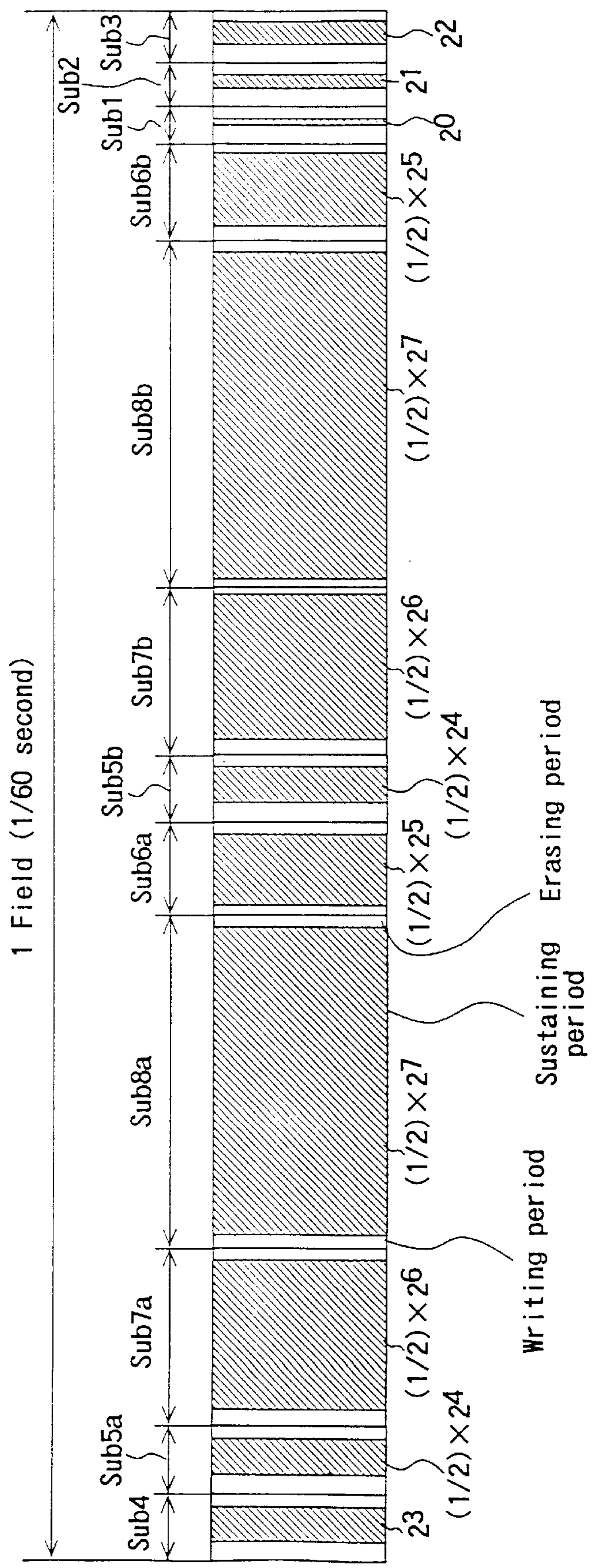
FIG. 20 is an explanatory view showing an arrangement of plural sub-fields in a display device driving for a gray scale expression in a fourth embodiment of the present invention.

FIG. 20 is an explanatory view showing an arrangement of plural sub-fields in a display device driving for a gray scale expression in a fourth embodiment of the present invention.

In a fourth embodiment, the sub-field Sub8 in the conventional embodiment shown in FIG. 34 is divided into sub-fields Sub8*a* and Sub8*b*, and the sub-field Sub7 shown in FIG. 34 is also divided into sub-fields Sub7*a* and Sub7*b*. Furthermore, the sub-field Sub6 in the conventional embodiment shown in FIG. 34 is divided into sub-fields Sub6*a* and Sub6*b*, and the sub-field Sub5 shown in FIG. 34 is also divided into sub-fields Sub5*a* and Sub5*b*. These sub-fields of the Sub5*a*, Sub7*a*, Sub8*a*, Sub6*a*, Sub5*b*, Sub7*b*, Sub8*b*, and Sub6*b* are disposed in the order at the center part of the field period. In addition, twelve sub-fields of the Sub4, Sub5*a*, Sub7*a*, Sub8*a*, Sub6*a*, Sub5*b*, Sub7*b*, Sub8*b*, Sub6*b*, Sub1, Sub2, and Sub3 are disposed in the order in the field period of 1/60 second as a whole.

FIG. 21 is a table showing a relation between luminance and the twelve sub-fields of FIG. 20.

In FIG. 21, each of the sustaining period is set in the twelve sub-fields Sub4, Sub5*a*, . . . , Sub3 so that their display screens have luminance values obtained by multiplying the values shown in the luminance column of FIG. 21 by the unit luminance B (cd/m$^2$). The luminance values of the sub-fields Sub5*a* and Sub5*b* are each set at $(\frac{1}{2})\times2^4\times$B, and the total of the luminance values is $2^4\times$B. The luminance values of the sub-fields Sub6*a* and Sub6*b* are each set at $(\frac{1}{2})\times2^5\times$B, and the total of the luminance values is $2^5\times$B. The luminance values of the sub-fields Sub7*a* and Sub7*b* are each set at $(\frac{1}{2})\times2^6\times$B, and the total of the luminance values is $2^6\times$B. In addition, the luminance values of the sub-fields Sub8*a* and Sub8*b* are each set at $(\frac{1}{2})\times2^7\times$B, and the total of the luminance values is $2^7\times$B.

With this arrangement of the twelve sub-fields, the emission display of the AC-type PDP-is performed by controlling the sub-fields. More specifically, as shown in the table of FIG. 22, the AC-type PDP can have the 256 gray scale expression ranging from the first gray scale to the 256-th gray scale by combining the ON and OFF states of the twelve sub-fields Sub4, Sub5*a*, Sub7*a*, Sub8*a*, Sub6*a*, Sub5*b*, Sub7*b*, Sub8*b*, Sub6*b*, Sub1, Sub2, and Sub3. The sub-fields Sub5*a* and Sub5*b* perform the same display operations so as to display the same content. The sub-fields Sub6*a* and Sub6*b* perform the same display operations so as to display the same content. The sub-fields Sub7*a* and Sub7*b* perform the same display operations so as to display the same content. Furthermore, the sub-fields Sub8*a* and Sub8*b* also perform the same display operations so as to display the same content. In FIG. 22, the luminance values of the twelve sub-fields Sub1, Sub2, . . . , Sub5*a*, Sub5*b*, Sub6*a*, Sub6*b*, Sub7*a*, Sub7*b*, Sub8*a*, and Sub8*b* are set at $2^0\times$B, $2^1\times$B, . . . , $\frac{1}{2}\times2^4\times$B, $\frac{1}{2}\times2^4\times$B, $\frac{1}{2}\times2^5\times$B, $\frac{1}{2}\times2^5\times$B, $\frac{1}{2}\times2^6\times$B, $\frac{1}{2}\times2^6\times$B, $\frac{1}{2}\times2^7\times$B, and $\frac{1}{2}\times2^7$B (cd/m$^2$), respectively.

The following description offers an explanation of the gray scale expression in the continuous fields using in the actual image display of TV or the like.

Figure 23:
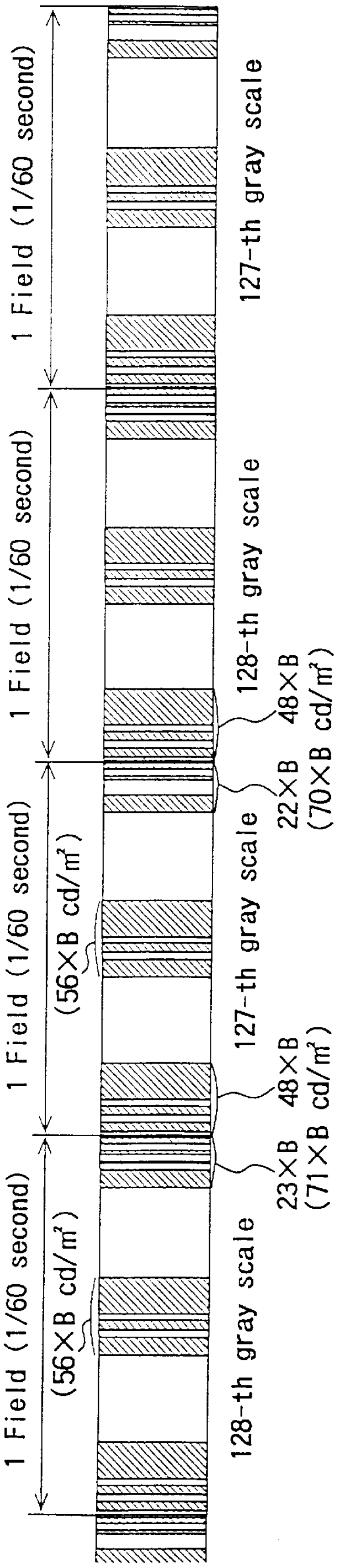
FIG. 23 is a diagram showing a timing of the display when the 128-th gray scale (127×B cd/m$^2$) and the 127-th gray scale (126×B cd/m$^2$) are alternately and repeatedly displayed every one field in the fourth embodiment of the present invention.
Figure 24:
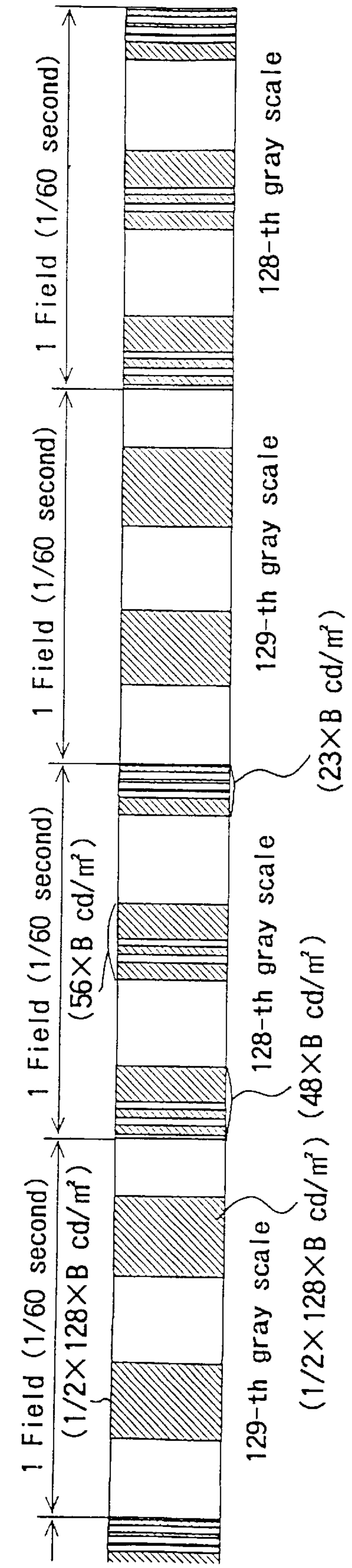
FIG. 24 is a diagram showing a timing of the display when the 129-th gray scale (128×B cd/m$^2$) and the 128-th gray scale (127×B cd/m$^2$) are alternately and repeatedly displayed every one field in the fourth embodiment of the present invention.

FIG. 23 and FIG. 24 are diagrams showing a timing of the displays when the image display are continuously performed by the driving method of the third embodiment so that luminance of the display screen changes by only one gray scale every one field. FIG. 23 is a diagram showing a timing of the display when the 128-th gray scale (127×B cd/m$^2$) and the 127-th gray scale (126×B cd/m$^2$) are alternately and repeatedly displayed every one field in the fourth embodiment of the present invention. FIG. 24 is a diagram showing a timing of the display when the 129-th gray scale (128×B cd/m$^2$) and the 128-th gray scale (127×B cd/m$^2$) are alternately and repeatedly displayed every one field in the fourth embodiment of the present invention.

As shown in FIG. 23, the 127-th gray scale (126×B cd/m$^2$) is divided and displayed into a 27-th portion (48×B cd/m$^2$ in total) disposed at the front end part of the field, a 28-th portion (56×B cd/m$^2$) disposed at the center part of the field, and a 29-th portion (22×B cd/m$^2$ in total) disposed at the rear end part of the field. As shown in FIG. 23 and FIG. 24, the 128-th gray scale (127×B cd/m$^2$) is divided and displayed into a 30-th portion (48×B cd/m$^2$ in total) disposed at the front end part of the field, a 31-th portion (56×B cd/m$^2$) disposed at the center part of the field, and a 32-th portion (23×B cd/m$^2$ in total) disposed at the rear end part of the field. As shown in FIG. 24, the 129-th gray scale (128×B cd/m$^2$) is divided and displayed into the 15-th portion (½×128×B cd/m$^2$), and the 16-th portion (½×128×B cd/m$^2$).

In FIG. 23, when the 127-th gray scale (126×B cd/m$^2$) and the 128-th gray scale (127×B cd/m$^2$) are alternately and repeatedly displayed every one field (1/60 second) in the continuous fields, the 32-th portion (23×B cd/m$^2$) is added to the 27-th portion (48×B cd/m$^2$). Thereby, the 32-th portion (23×B cd/m$^2$) and the 27-th portion (48×B cd/m$^2$)

are displayed as a 33-th portion (71=23+48 B cd/$m^2$). Furthermore, the 29-th portion (22×B cd/$m^2$) is added to the 30-th portion (48×B cd/$m^2$). Thereby, the 29-th portion (22×B cd/$m^2$) and the 30-th portion (48×B cd/$m^2$) are displayed as a 34-th portion (70=22+48 B cd/$m^2$).

As a result, in the case that the 127-th gray scale and the 128-th gray scale are alternately and repeated displayed every one field, the 32-th, the 29-th, the 34-th, and the 31-th portions are displayed in that order.

On the other hand, in FIG. 24, the 129-th gray scale (128×B cd/$m^2$) is divided and displayed into the 15-th and the 16-th portions (½×128×B cd/$m^2$). This condition is equivalent to the condition wherein a field period is shortened to ½ of 1/60 second. Furthermore, the 128-th gray scale (127×B cd/$m^2$) is divided and displayed into the 30-th portion (48×B cd/$m^2$), the 31-th portion (56×B cd/$m^2$), and the 32-th portion (23×B cd/$m^2$). This condition is equivalent to the condition wherein a field period is shortened to ⅓ of 1/60 second.

As a result, time interval in which the luminance changes is shortened. The change of luminance appears to be averaged on the display screen, since the human eyes have slow response speed. Thereby, accurate gray scale expression can be attained without causing flicker noise.

This accurate gray scale expression without the flicker noise can be attained because of the following configurational reasons. The sub-field Sub8 having the highest luminance value is divided into two parts of the sub-fields Sub8*a* and the Sub8*b*, and the sub-field Sub7 having the second highest luminance value is divided into two parts of the sub-fields Sub7*a* and the Sub7*b*. Furthermore, the sub-field Sub6 having the third highest luminance value is divided into two parts of the sub-fields Sub6*a* and the Sub6*b*, and the sub-field Sub5 having the fourth highest luminance value is divided into two parts of the sub-fields Sub5*a* and the Sub5*b*. In addition, these parts of the sub-fields Sub5*a*, Sub7*a*, Sub8*a*, Sub6*a*, Sub5*b*, Sub7*b*, Sub8*b*, and Sub6*b* are disposed in the order in the center part of the field period. Thereby, the displays of the sub-fields are nearly evenly dispersed in continuous fields.

In this fourth embodiment, a driving circuit for forming the field shown in FIG. 20 is the same of the first embodiment shown in FIG. 6. As shown in FIG. 25 there is difference from the first embodiment shown in FIG. 7 that the sub-fields Sub5, Sub6, Sub7 and Sub8 are divided into sub-fields Sub5*a* and Sub5*b*, Sub6*a* and Sub6*b*, Sub7*a* and Sub7*b*, and Sub8*a* and Sub8*b*, respectively.

In the above explanation of the fourth embodiment wherein the AC-type PDP is taken as an example, the sub-fields Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. Moreover, the sub-field Sub6 having the third highest luminance value is divided into two parts of the sub-fields Sub6*a* and the Sub6*b*, and the sub-field Sub5 having the fourth highest luminance value is divided into two parts of the sub-fields Sub5*a* and the Sub5*b*. In addition, the twelve sub-fields of the Sub4, Sub5*a*, Sub7*a*, Sub8*a*, Sub6*a*, Sub5*b*, Sub7*b*, Sub8*b*, Sub6*b*, Sub1, Sub2, and Sub3 are disposed in the order in the field period of 1/60 second. However, the configuration of the field period can be applied to other display device. That is, in the case of the display device having only one emission displaying period corresponded to the sustaining period, the same effect can be obtained by dividing the above-mentioned arrangement of the twelve sub-fields.

Furthermore, in the above-mentioned embodiment, the luminance values of the sub-fields Sub1*a* and Sub5*b* are set at the same value of (½)x$2^4$×B (cd/$m^2$). However, it is not always necessary to equally divide the respective luminance values of the Sub5. In other words, it is only required that the total of the luminance values of the sub-fields Sub5*a* and Sub5*b* is $2^4$×B (cd/$m^2$).

Moreover, in the fourth embodiment, the sub-fields Sub5, Sub6, Sub7 and Sub8 are each divided into two sub-fields of the Sub1*a*, the Sub5*b*, the Sub6*a*, the Sub6*b*, the Sub7*a*, the Sub7*b*, and the Sub8*a*, the Sub8*b* respectively. However, one or both of the sub-fields Sub5, Sub6, Sub7 and Sub8 can be divided into three or more sub-field parts.

<Embodiment 5>

Figure 26:
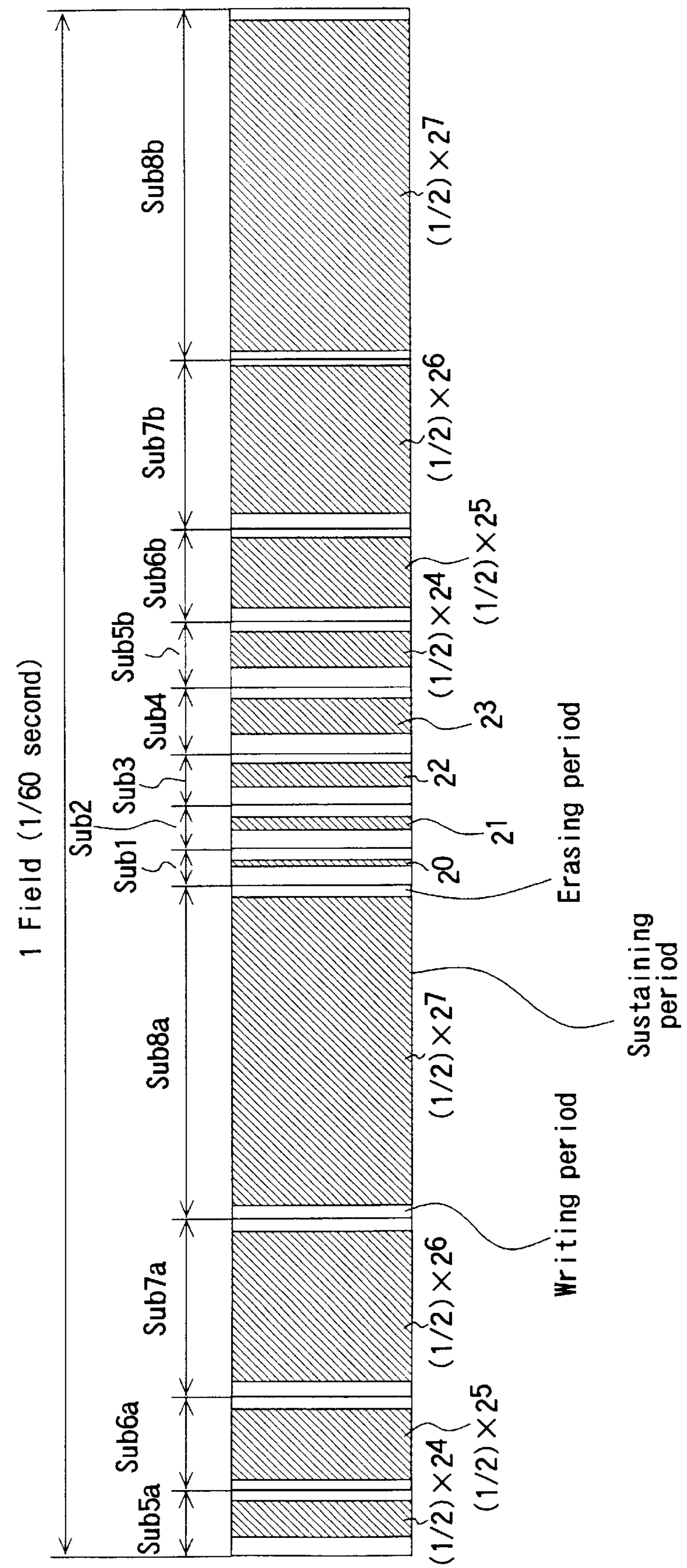
FIG. 26 is an explanatory view showing an arrangement of plural sub-fields in a display device driving for a gray scale expression in a fifth embodiment of the present invention.

FIG. 26 is an explanatory view showing an arrangement of plural sub-fields in a display device driving for a gray scale expression in a fifth embodiment of the present invention.

In a fifth embodiment, the sub-field Sub8 in the conventional embodiment shown in FIG. 34 is divided into sub-fields Sub8*a* and Sub8*b*, and the sub-field Sub7 shown in FIG. 34 is also divided into sub-fields Sub7*a* and Sub7*b*. Furthermore, the sub-field Sub6 in the conventional embodiment shown in FIG. 34 is divided into sub-fields Sub6*a* and Sub6*b*, and the sub-field Sub5 shown in FIG. 34 is also divided into sub-fields Sub5*a* and Sub5*b*. In this fifth embodiment, these sub-fields of the Sub5*a*, Sub6*a*, Sub7*a*, and Sub8*a* are disposed at the front end part of the field in the order, and these sub-fields of the Sub5*b*, Sub6*b*, Sub7*b*, and Sub8*b* are disposed at the rear end part of the field in the order. In addition, twelve sub-fields of the Sub5*a*, Sub6*a*, Sub7*a*, Sub8*a*, Sub1, Sub2, Sub3, Sub4, Sub5*b*, Sub6*b*, Sub7*b*, and Sub8*b* are disposed in the order in the field period of 1/60 second as a whole.

FIG. 27 is a table showing a relation between luminance and the twelve sub-fields of FIG. 26.

In FIG. 26, each of the sustaining period is set in the twelve sub-fields Sub5*a*, Sub6*a*, . . . , Sub8*b* so that their display screens have luminance values obtained by multiplying the values shown in the luminance column of FIG. 27 by the unit luminance B (cd/$m^2$). The luminance values of the sub-fields Sub5*a* and Sub5*b* are each set at (½)x$2^4$×B, and the total of the luminance values is $2^4$×B. The luminance values of the sub-fields Sub6*a* and Sub6*b* are each set at (½)x$2^5$×B, and the total of the luminance values is $2^5$×B. The luminance values of the sub-fields Sub7*a* and Sub7*b* are each set at (½)x$2^6$×B, and the total of the luminance values is $2^6$×B. In addition, the luminance values of the sub-fields Sub8*a* and Sub8*b* are each set at (½)x$2^7$×B, and the total of the luminance values is $2^7$×B.

With this arrangement of the twelve sub-fields, the emission display of the AC-type PDP is performed by controlling the sub-fields. More specifically, as shown in the table of FIG. 28, the AC-type PDP can have the 256 gray scale expression ranging from the first gray scale to the 256-th gray scale by combining the ON and OFF states of the twelve sub-fields Sub5*a*, Sub6*a*, Sub7*a*, Sub8*a*, Sub1, Sub2, Sub3, Sub4, Sub5*b*, Sub6*b*, Sub7*b*, and Sub8*b*. The sub-fields Sub5*a* and Sub5*b* perform the same display operations so as to display the same content. The sub-fields Sub6*a* and Sub6*b* perform the same display operations so as to display the same content. The sub-fields Sub7*a* and Sub7*b* perform the same display operations so as to display the same content. Furthermore, the sub-fields Sub8*a* and Sub8*b* also perform the same display operations so as to display the same content. In FIG. 28, the luminance values of the twelve sub-fields Sub1, Sub2, . . . , Sub5*a*, Sub5*b*, Sub6*a*, Sub6*b*, Sub7*a*, Sub7*b*, Sub8*a*, and Sub8*b* are set at $2^0$×B, $2^1$×B, . . . , ½×$2^4$×B, ½×$2^4$×B, ½×$2^5$×B, ½×$2^5$×B, ½×$2^6$×B, ½×$2^6$×B, ½×$2^7$×B, and ½×$2^7$ B (cd/$m^2$), respectively.

The following description offers an explanation of the gray scale expression in the continuous fields using in the actual image display of TV or the like.

Figure 29:
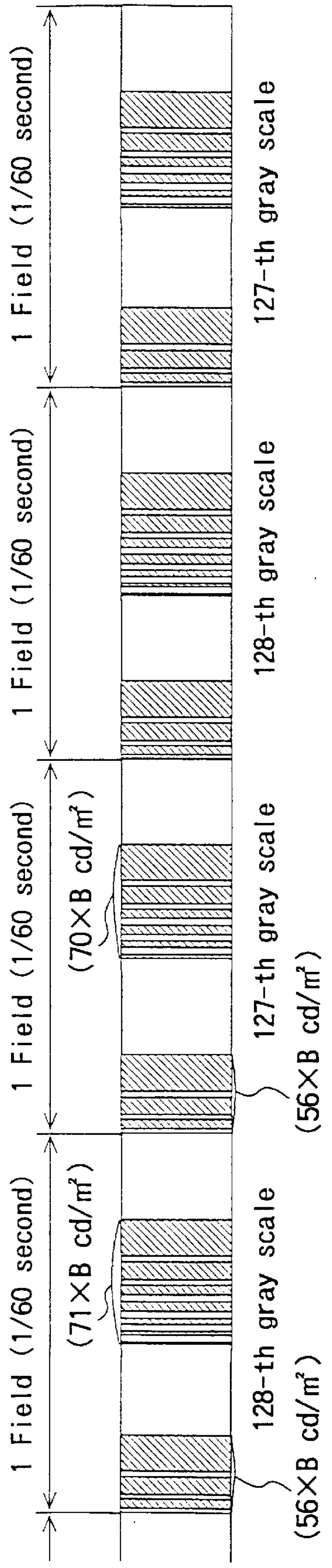
FIG. 29 is a diagram showing a timing of the display when the 128-th gray scale (127×B cd/m$^2$) and the 127-th gray scale (126×B cd/m$^2$) are alternately and repeatedly displayed every one field in the fifth embodiment of the present invention.
Figure 30:
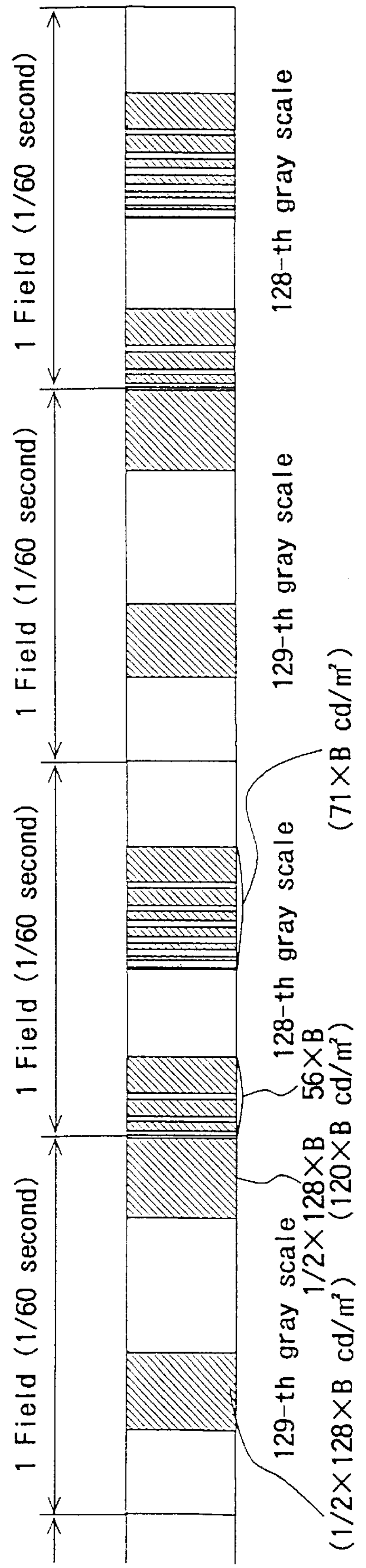
FIG. 30 is a diagram showing a timing of the display when the 129-th gray scale (128×B cd/m$^2$) and the 128-th gray scale (127×B cd/m$^2$) are alternately and repeatedly displayed every one field in the fifth embodiment of the present invention.
Figure 32:
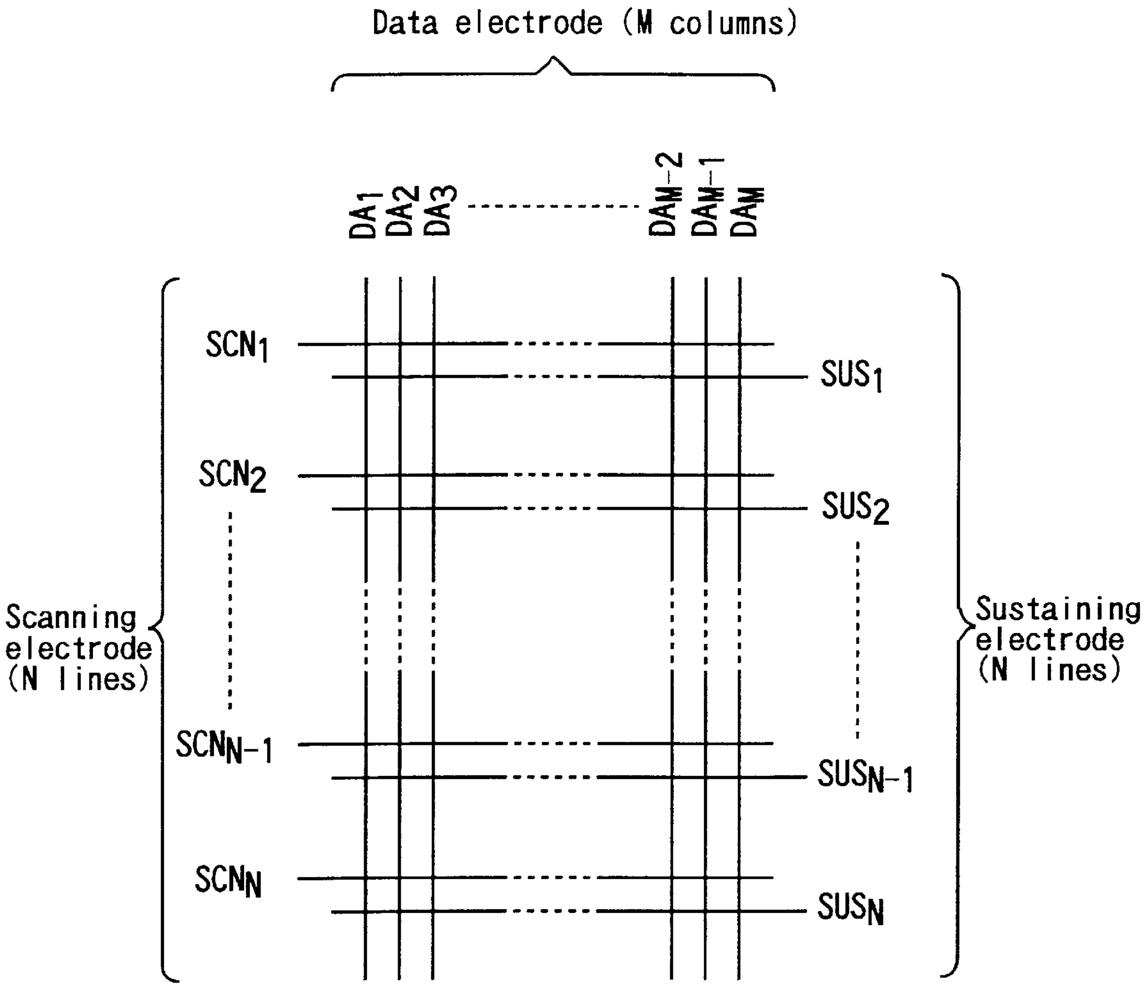
F I G. 32 (Prior Art)
FIG. 32 is a wiring diagram showing an electrode arrangement for an AC-type PDP.

FIG. 29 and FIG. 30 are diagrams showing a timing of the displays when the image display are continuously performed by the driving method of the third embodiment so that luminance of the display screen changes by only one gray scale every one field. FIG. 29 is a diagram showing a timing of the display when the 128-th gray scale (127×B cd/$m^2$) and the 127-th gray scale (126×B cd/$m^2$) are alternately and repeatedly displayed every one field in the fifth embodiment of the present invention. FIG. 30 is a diagram showing a timing of the display when the 129-th gray scale (128×B cd/$m^2$) and the 128-th gray scale (127×B cd/$m^2$) are alternately and repeatedly displayed every one field in the fifth embodiment of the present invention.

As shown in FIG. 29, the 127-th gray scale (126×B cd/$m^2$) is divided and displayed into a 35-th portion (56×B cd/$m^2$ in total) and a 36-th portion (70×B cd/$m^2$ in total). As shown in FIG. 29 and FIG. 30, the 128-th gray scale (127×B cd/$m^2$) is divided and displayed into the 35-th portion (56×B cd/$m^2$ in total), and a 37-th portion (71×B cd/$m^2$ in total). As shown in FIG. 30, the 129-th gray scale (128×B cd/$m^2$) is divided and displayed into the 15-th portion (½×128×B cd/$m^2$), and the 16-th portion (½×128×B cd/$m^2$).

In FIG. 29, the 127-th gray scale (126×B cd/$m^2$) is divided and displayed into the 35-th portion (56×B cd/$m^2$) and the 36-th portion (70×B cd/$m^2$). This condition is equivalent to the condition wherein a field period is shortened to ½ of 1/60 second. Furthermore, in FIG. 29, the 128-th gray scale (127×B cd/$m^2$) is divided and displayed into the 35-th portion (56×B cd/$m^2$), and the 37-th portion (71×B cd/$m^2$). This condition is equivalent to the condition wherein a field period is shortened to ½ of 1/60 second.

On the other hand, in FIG. 30, when the 128-th gray scale (127×B cd/$m^2$) and the 129-th gray scale (128×B cd/$m^2$) are alternately and repeatedly displayed every one field (1/60 second) in the continuous fields, the 16-th portion (½×128×B cd/$m^2$) is added to the 35-th portion (56×B cd/$m^2$). Thereby, the 16-th portion (½×128×B cd/$m^2$) and the 35-th portion (56×B cd/$m^2$) are displayed as a 38-th portion (120=64+56×B cd/$m^2$).

As a result, in the case that the 128-th gray scale (127×B cd/$m^2$) and the 129-th gray scale (128×B cd/$m^2$) are alternately and repeatedly displayed every one field, the 15-th, the 38-th, and the 37-th portions are displayed in that order.

Thus, time interval in which the luminance changes is shortened. The change of luminance appears to be averaged on the display screen, since the human eyes have slow response speed. Thereby, accurate gray scale expression can be attained without causing flicker noise.

Figure 39:
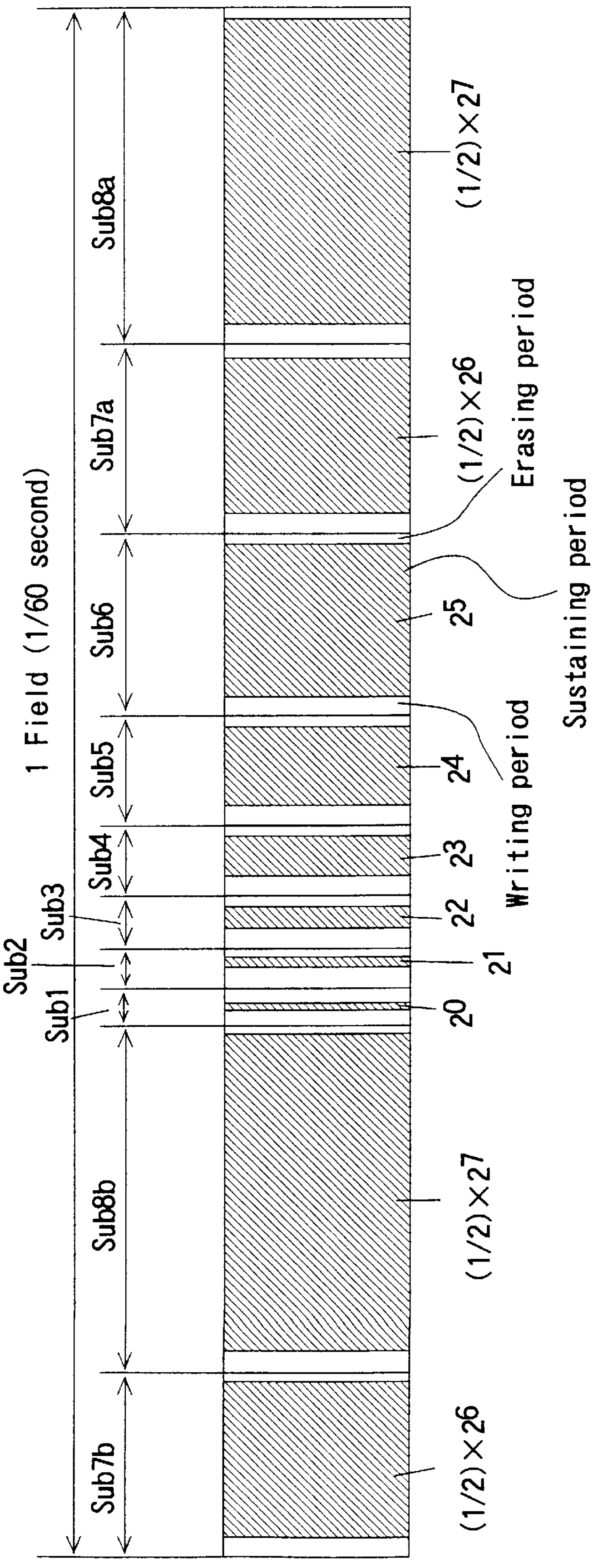
FIG. 39 (Prior Art)
FIG. 39 is an explanatory view showing an arrangement of plural sub-fields in a second conventional display device driving for the gray scale expression.
Figure 42:
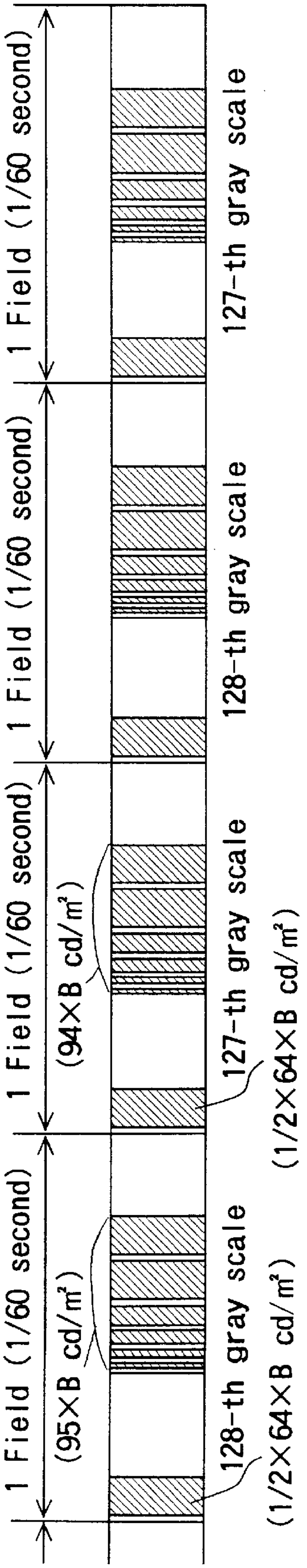
FIG. 42 (Prior Art)
FIG. 42 is a diagram showing a timing of the display when the 128-th gray scale (127×B cd/$m^2$) and the 127-th gray scale (126×B cd/$m^2$) are alternately and repeatedly displayed every one field in the second conventional display device driving.
Figure 43:
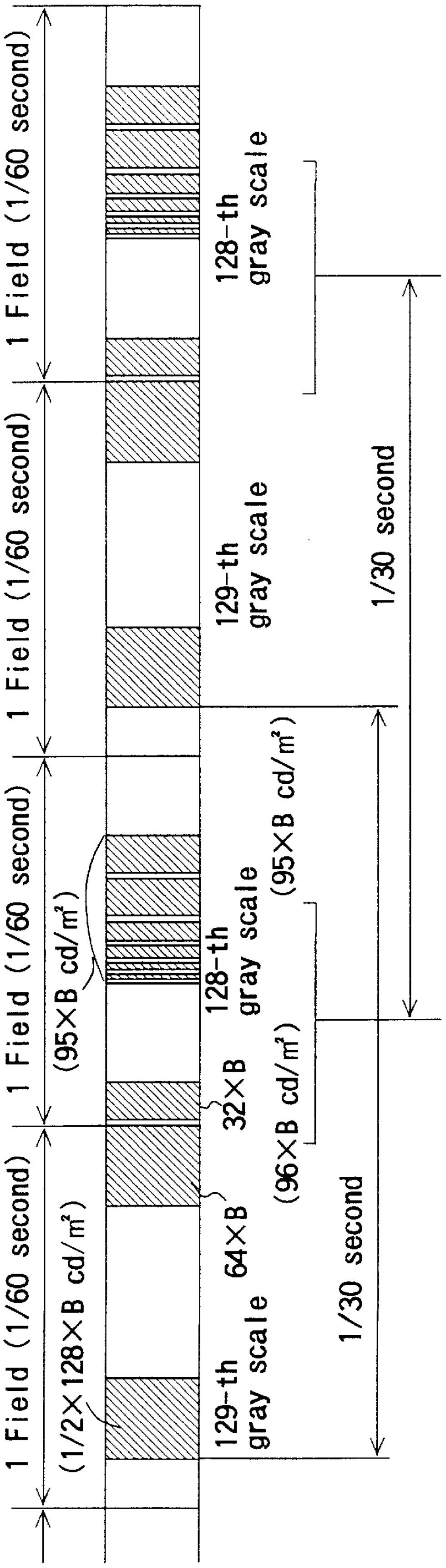
F I G. 43 (Prior Art)
FIG. 43 is a diagram showing a timing of the display when the 129-th gray scale (128×B cd/$m^2$) and the 128-th gray scale (127×B cd/$m^2$) are alternately and repeatedly displayed every one field in the second conventional display device driving.
Figure 44:
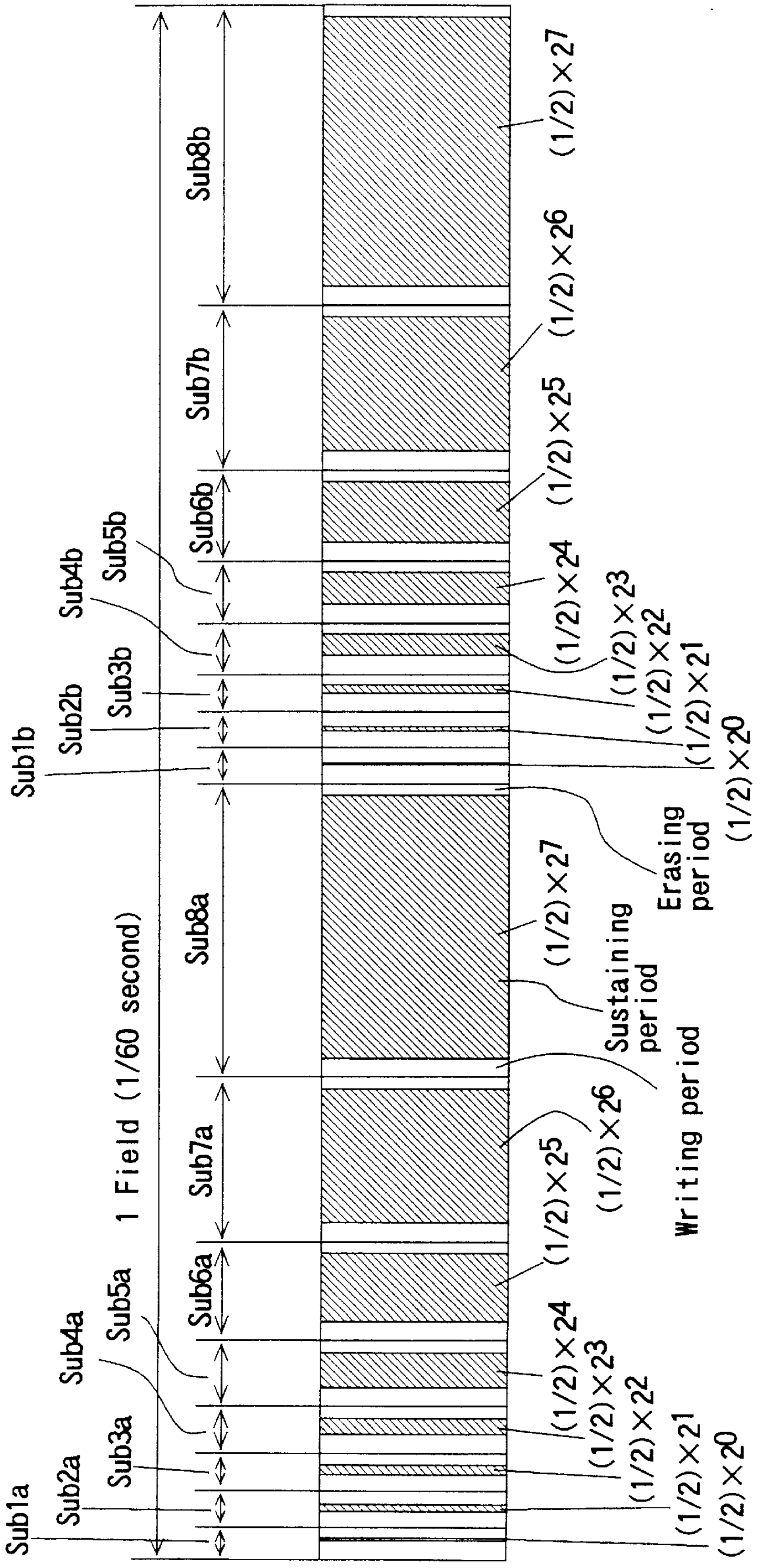
FIG. 44 (Prior Art)
FIG. 44 is an explanatory view showing an arrangement of plural sub-fields in a third conventional display device driving for the gray scale expression.
Figure 45:
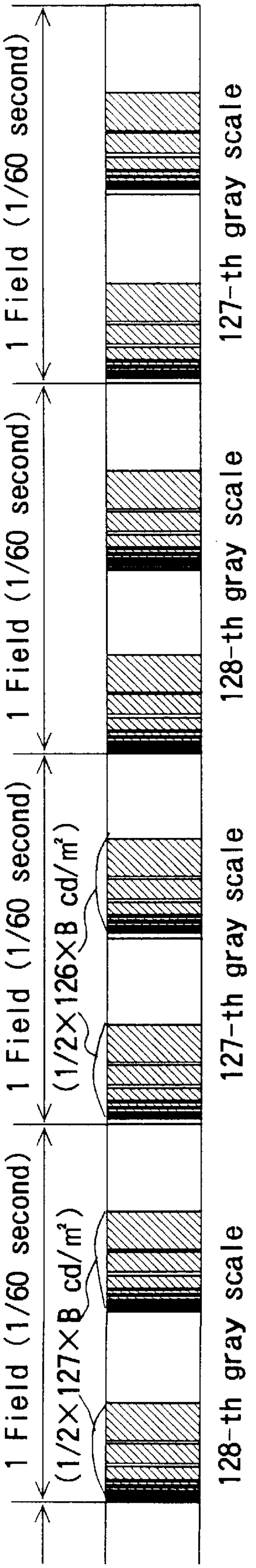
FIG. 45 (Prior Art)
FIG. 45 is a diagram showing a timing of the display when the 128-th gray scale (127×B cd/$m^2$) and the 127-th gray scale (126×B cd/$m^2$) are alternately and repeatedly displayed every one field in the third conventional display device driving.
Figure 46:
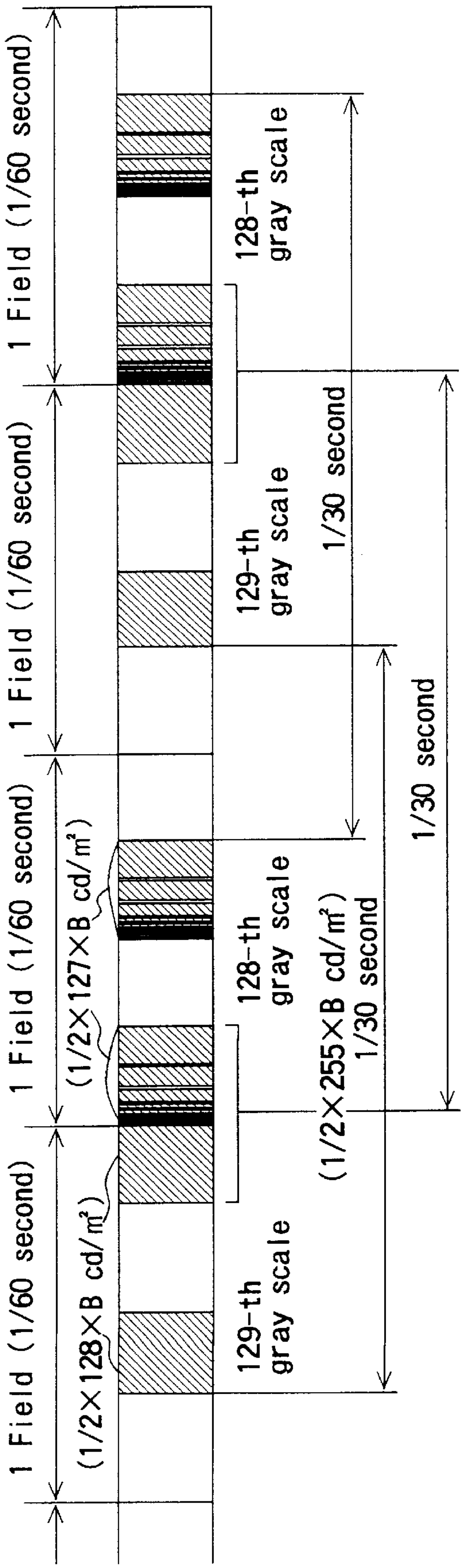
FIG. 46 (Prior Art)
FIG. 46 is a diagram showing a timing of the display when the 129-th gray scale (128×B cd/$m^2$) and the 128-th gray scale (127×B cd/$m^2$) are alternately and repeatedly displayed every one field in the third conventional display device driving.

Furthermore, in this fifth embodiment, there are remarkable effects in comparison with the second conventional display device driving shown by FIG. 39. For example, when the 128-th gray scale (127×B cd/$m^2$) and the 129-th gray scale (128×B cd/$m^2$) are alternately and repeatedly displayed every one field, the change of luminance appears to be decreased in order of 120×B, 71×B, and 64×B every two fields (1/30second). In addition, in the case that continuous two emission displays are considered, the change of luminance appears to be increased in order of 135 (71+64)×B, 184 (64+120)×B, and 191 (120+71)×B every two fields (1/30 second). As a result, emission display appears to be mixed the decreasing change of luminance and the increasing change of luminance, since the human eyes have slow response speed. Thereby, the change of luminance appears to be further averaged on the display screen.

On the other hand, in the second conventional display device driving, when the 128-th gray scale (127×B cd/$m^2$) and the 129-th gray scale (128×B cd/$m^2$) are alternately and repeatedly displayed every one field, luminance changes in order of 96×B, 95×B, and 64×B every two fields (1/3 second). In addition, in the case that continuous two emission displays are considered, luminance changes in order of 191 (96+95)×B, 159 (95+64)×B, and 160 (64+96)×B every two fields (1/3 second). As a result, it is impossible that the change of luminance appears to be averaged on the display screen.

This accurate gray scale expression without the flicker noise can be attained because of the following configurational reasons. The sub-field Sub8 having the highest luminance value is divided into two parts of the sub-fields Sub8*a* and the Sub8*b*, and the sub-field Sub7 having the second highest luminance value is divided into two parts of the sub-fields Sub7*a* and the Sub7*b*. Furthermore, the sub-field Sub6 having the third highest luminance value is divided into two parts of the sub-fields Sub6*a* and the Sub6*b*, and the sub-field Sub5 having the fourth highest luminance value is divided into two parts of the sub-fields Sub5*a* and the Sub5*b*. In addition, the twelve sub-fields of the Sub5*a*, Sub6*a*, Sub7*a*, Sub8*a*, Sub1, Sub2, Sub3, Sub4, Sub5*b*, Sub6*b*, Sub7*b*, and Sub8*b* are disposed in the order in the field period of 1/60 second.

Furthermore, in the fifth embodimof the Sub-fields of the Sub1, Sub2, Sub3, and Sub4 are disposed in the center part of the field period. Thereby, in the case that the gray scale expression is performed with lower luminance value for display of skin, accurate gray scale expression can be attained without causing flicker noise.

In this fifth embodiment, a driving circuit for forming the field shown in FIG. 26 is the same of the first embodiment shown in FIG. 6. As shown in FIG. 31 there is difference from the first embodiment shown in FIG. 7 that the sub-fields Sub5, Sub6, Sub7 and Sub8 are divided into sub-fields Sub5*a* and Sub5*b*, Sub6*a* and Sub6*b*, Sub7*a* and Sub7*b*, and Sub8*a* and Sub8*b*, respectively.

In the above explanation of the fifth embodiment wherein the AC-type PDP is taken as an example, the sub-fields Sub8 having the highest luminance value is divided into two parts of the sub-fields Sub8*a* and the Sub8*b*. Furthermore, the sub-field Sub7 having the second highest luminance value is divided into two parts of the sub-fields Sub7*a* and the Sub7*b*. Moreover, the sub-field Sub6 having the third highest luminance value is divided into two parts of the sub-fields Sub6*a* and the Sub6*b*, and the sub-field Sub5 having the fourth highest luminance value is divided into two parts of the sub-fields Sub5*a* and the Sub5*b*. In addition, the twelve sub-fields of the Sub5*a*, Sub6*a*, Sub7*a*, Sub8*a*, Sub1, Sub2, Sub3, Sub4, Sub5*b*, Sub6*b*, Sub7*b*, and Sub8*b* are disposed in the order in the field period of 1/60 second. However, the configuration of the field period can be applied to other display device. That is, in the case of the display device having only one emission displaying period corresponded to the sustaining period, the same effect can be obtained by dividing the above-mentioned arrangement of the twelve sub-fields.

Furthermore, in the above-mentioned embodiment, the luminance values of the sub-fields Sub5*a* and Sub5*b* are set at the same value of (½)×$2^4$×B (cd/$m^2$). However, it is not always necessary to equally divide the respective luminance values of the Sub5. In other words, it is only required that the total of the luminance values of the sub-fields Sub5*a* and Sub5*b* is $2^4 \times B$ (cd/$m^2$).

Moreover, in the fifth embodiment, the sub-fields Sub5, Sub6, Sub7 and Sub8 are each divided into two sub-fields of the Sub5*a*, the Sub5*b*, the Sub6*a*, the Sub6*b*, the Sub7*a*, the Sub7*b*, and the Sub8*a*, the Sub8*b* respectively. However, one or both of the sub-fields Sub5, Sub6, Sub7 and Sub8 can be divided into three or more sub-field parts.

Although the above-mentioned embodiments are explained by taking the AC-type PDP as an example, it is needless to say that the driving method for the gray scale expression in the display device in accordance with the present invention is also applicable to various display devices such as DC-type PDP, LCD and EL.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A display device driving method for a gray scale expression by selectively performing emission displays of plural sub-fields with different luminance values in one field period comprising the steps of:

dividing each one or more sub-fields having the highest luminance value and subsequent luminance values in descending order into a plurality of sub-field parts of said plural sub-fields; and disposing said plurality of sub-field parts in said field period separately, wherein said plurality of sub-field parts are disposed in the center portion of said field period.

2. A display device driving method for a gray scale expression by selectively performing emission displays of plural sub-fields with different luminance values in one field period comprising the steps of:

dividing each one or more sub-fields having the highest luminance value and subsequent luminance values in descending order into a plurality of sub-field parts of said plural sub-fields; and disposing said plurality of sub-field parts in said field period separately, wherein said step of dividing comprises:

dividing a sub-field having the highest luminance value into first sub-field parts of said plural sub-fields;

dividing said sub-field having the second highest luminance value into second sub-field parts of said plural sub-fields; and disposing said first sub-field parts and said second sub-field parts in the center portion of said field period so that each part of said first sub-field parts and each part of said second sub-field parts are alternately disposed.

3. A display device driving method for a gray scale expression by selectively performing emission displays of plural sub-fields with different luminance values in one field period comprising the steps of:

dividing each one or more sub-fields having the highest luminance value and subsequent luminance values in descending order into a plurality of sub-field parts of said plural sub-fields; and disposing said plurality of sub-field parts in said field period separately, wherein said step of dividing comprises:

dividing a sub-field having the highest luminance value into first sub-field parts of said plural sub-fields;

dividing said sub-field having the second highest luminance value into second sub-field parts of said plural sub-fields;

dividing said sub-field having the third highest luminance value into third sub-field parts of said plural sub-fields; and disposing said first sub-field parts, said second sub-field parts, and said third sub-field parts in the center portion of said field period so that each part of said first sub-field parts, each part of said second sub-field parts, and each part of said third sub-field parts are continuously disposed.

4. A display device driving method for a gray scale expression by selectively performing emission displays of plural sub-fields with different luminance values in one field period comprising the steps of;

dividing each one or more sub-fields having the highest luminance value and subsequent luminance values in descending order into a plurality of sub-field parts of said plural sub-fields; and disposing said plurality of sub-field parts in said field period separately, wherein said step of dividing comprises:

dividing a sub-field having the highest luminance value into first sub-field parts of said plural sub-fields;

dividing said sub-field having the second highest luminance value into second sub-field parts of said plural sub-fields;

dividing said sub-field having the third highest luminance value into third sub-field parts of said plural sub-fields;

dividing said sub-field having the fourth highest luminance value into fourth sub-field parts of said plural sub-fields; and disposing said first sub-field parts, said second sub-field parts, said third sub-field parts, and said fourth sub-field parts in the center portion of said field period so that each part of said first sub-field parts, each part of said second sub-field parts, each part of said third sub-field parts, and each part of said fourth sub-field parts are continuously disposed.

5. A display device driving method for a gray scale expression by selectively performing emission displays of plural sub-fields with different luminance values in one field period comprising the steps of:

dividing said sub-field having the highest luminance value into first sub-field parts of said plural sub-fields;

dividing said sub-field having the second highest luminance value into second sub-field parts of said plural sub-fields;

dividing said sub-field having the third highest luminance value into third sub-field parts of said plural sub-fields;

dividing said sub-field having the fourth highest luminance value into fourth sub-field parts of said plural sub-fields; and disposing said first sub-field parts, said second sub-field parts, said third sub-field parts, and said fourth sub-field parts in both end portions of said field period, and disposing sub-fields which are not divided into said plurality of sub-field parts in the center portion of said field period.

6. A display device driving method for a gray scale expression by selectively performing emission displays of plural sub-fields with different luminance values in one field period comprising the steps of:

dividing said sub-field having the highest luminance value into first sub-field parts of said plural sub-fields;

dividing said sub-field having the second highest luminance value into second sub-field parts of said plural sub-fields;

dividing said sub-field having the third highest luminance value into third sub-field parts of said plural sub-fields;

dividing said sub-field having the fourth highest luminance value into fourth sub-field parts of said plural sub-fields; and disposing said first sub-field parts, said second sub-field parts, said third sub-field parts, and said fourth sub-field parts asymmetrically in both end portions of said field period, and disposing sub-fields which are not divided into said plurality of sub-field parts in the center portion of said field period.

* * * * *